United States Patent
Matsui

(10) Patent No.: US 7,366,241 B2
(45) Date of Patent: Apr. 29, 2008

(54) DATA REPRODUCTION APPARATUS AND DATA REPRODUCTION METHOD

(75) Inventor: Yoshinori Matsui, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1314 days.

(21) Appl. No.: 10/108,895

(22) Filed: Mar. 29, 2002

(65) Prior Publication Data

US 2002/0141740 A1    Oct. 3, 2002

(30) Foreign Application Priority Data

Mar. 29, 2001  (JP)  ............... 2001-097023

(51) Int. Cl.
*H04N 7/12* (2006.01)
*H04N 7/26* (2006.01)

(52) U.S. Cl. ................. 375/240.27; 386/111

(58) Field of Classification Search .......... 375/240.27, 375/240.16, 240.02, 240.13, 245; 380/211; 386/111, 98; 714/747, 758
See application file for complete search history.

(56) References Cited

U.S. PATENT DOCUMENTS

| 4,519,085 A | * | 5/1985 | Catros | 375/245 |
| 4,661,956 A | * | 4/1987 | Izumita et al. | 714/758 |
| 4,718,067 A | * | 1/1988 | Peters | 714/747 |
| 5,420,872 A | * | 5/1995 | Hyodo et al. | 714/747 |
| 5,572,333 A | * | 11/1996 | Moriyama et al. | 386/98 |
| 2002/0076049 A1 | * | 6/2002 | Boykin et al. | 380/211 |
| 2002/0141740 A1 | * | 10/2002 | Matsui | 386/111 |

FOREIGN PATENT DOCUMENTS

| EP | 0 939 545 | 9/1999 |
| JP | 11-313301 | 11/1999 |
| JP | 2001-45098 | 2/2001 |
| JP | 2001-94963 | 4/2001 |

OTHER PUBLICATIONS

Satoshi Ishibashi, "A Study of Compressed Video Bitstream Translation for a Scalable Video On Demand System", Sep. 4, 1998, pp. 13-18 along with Partial English translation.

* cited by examiner

*Primary Examiner*—Gims Philippe
(74) *Attorney, Agent, or Firm*—Wenderoth, Lind & Ponack, L.L.P.

(57) ABSTRACT

In a data transmission system, a server is provided with a data storage unit which holds plural video streams having different I-frame intervals, as coded data corresponding to the same video sequence, and a data transmission unit for transmitting a predetermined video stream among the plural video streams, according to a command signal Sc from a receiving terminal. The receiving terminal transmits a data designation signal (command signal) Sc which designates one of the plural video streams stored at the server end, to the server, on the basis of the contents of user setting. Therefore, at the receiving terminal, a video stream to be supplied from the transmitting end (server) can be selected between one having a high resistance to transmission error and one having a high video quality, according to the user's preference.

17 Claims, 22 Drawing Sheets

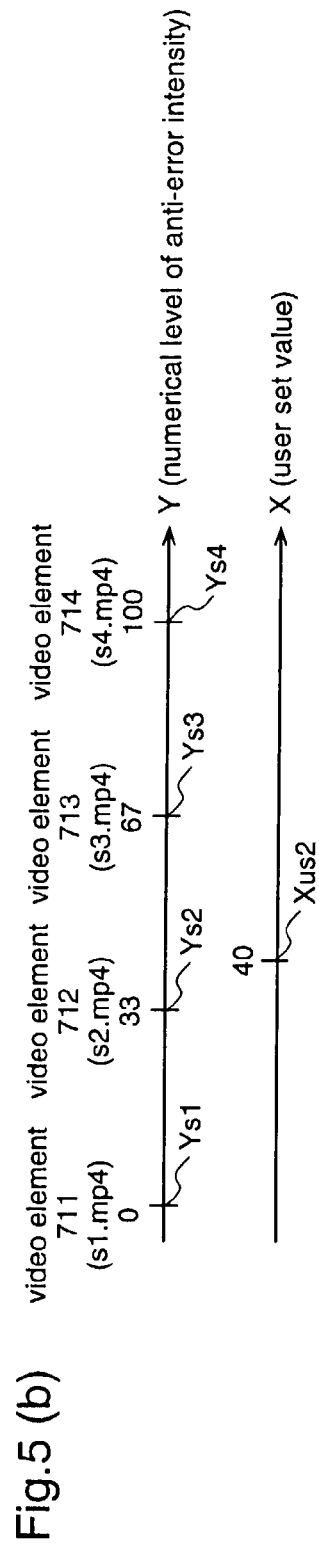

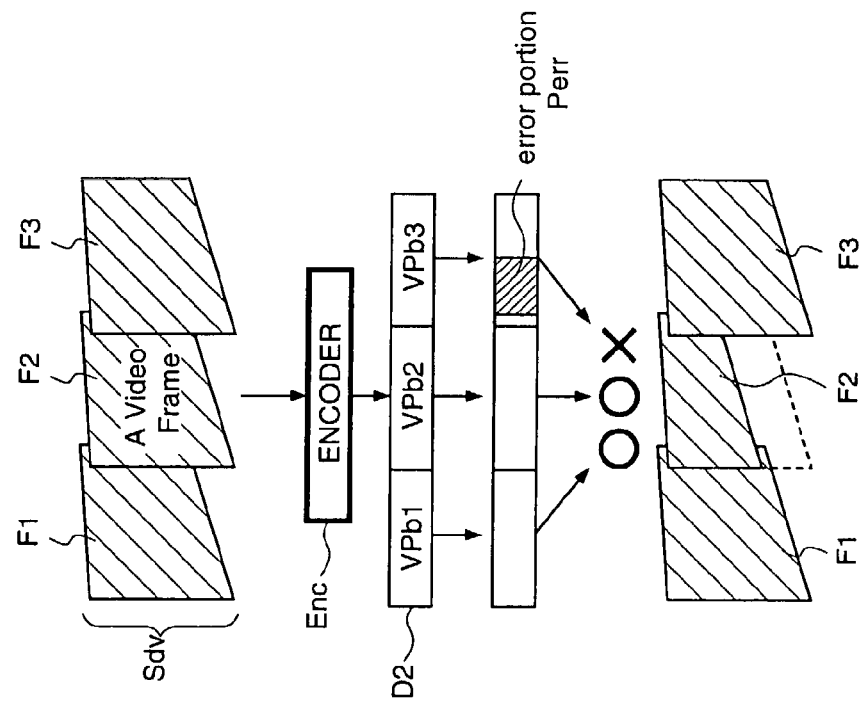
Fig.6 (b) A case where one video frame is coded as three video packets
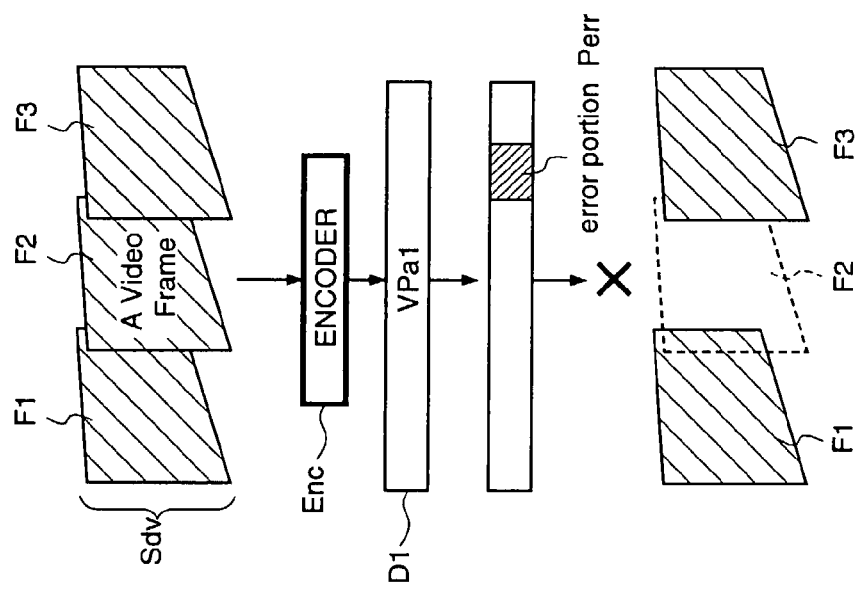
Fig.6 (a) A case where one video frame is coded as one video packet (memory contents)

|  | entry No. | execution flag (0/1) | anti-error intensity | URL name | latest time stamp |
|---|---|---|---|---|---|
| E1 { | 1 | 0 | 0 | rtsp://s.com/s1.mp4 | 0 |
| E2 { | 2 | 1 | 33 | rtsp://s.com/s2.mp4 | 3060000 |
| E3 { | 3 | 0 | 67 | rtsp://s.com/s3.mp4 | 0 |
| E4 { | 4 | 0 | 100 | rtsp://s.com/s4.mp4 | 0 |

(relationship between incidence of error and anti-error intensity)

| error rate (threshold) Eth (%) | anti-error intensity |
|---|---|
| Eth=0(%) | lowest |
| 0<Eth≦3 | 30 |
| 3<Eth≦6 | 60 |
| 6<Eth | highest |

Rte

Fig.13 (a)

(SMIL file)

```
732a ─ <switch>
 721 ─ <video src="rtsp://s.com/s1.mp4"system-protocol="nop"/>
 722 ─ <video src="rtsp://s.com/s2.mp4"system-protocol="ret"/>
 723 ─ <video src="rtsp://s.com/s3.mp4"system-protocol="fec+ret"/>
732b ─ </switch>
```
∼ $F_{SD3}$

Fig.13 (b)

(memory contents)

| entry No. | execution flag (0/1) | protocol type | URL name | latest time stamp |
|---|---|---|---|---|
| 1 | 1 | nop | rtsp://s.com/s1.mp4 | 3060000 |
| 2 | 0 | ret | rtsp://s.com/s2.mp4 | 0 |
| 3 | 0 | fec | rtsp://s.com/s3.mp4 | 0 |

E1 = row 1, E2 = row 2, E3 = row 3

Fig.13 (c)

(relationship between error rate and protocol)

| error rate (threshold) Eth (%) | protocol |
|---|---|
| Eth=0 | nop |
| 0<Eth≦3 | ret |
| 3<Eth | fec+ret |

∼ Rtp

Prior Art

DATA REPRODUCTION APPARATUS AND DATA REPRODUCTION METHOD

FIELD OF THE INVENTION

The present invention relates to a data reproduction apparatus and a data reproduction method and, more particularly, to a data reproduction process in which anti-transmission-error property and video quality of video data to be obtained at a receiving end can be changed according to the user's preference or the occurrence status of transmission error, at the receiving end of the video data.

BACKGROUND OF THE INVENTION

In recent years, distribution of audio-visual data in narrow bands has become possible, as the international standard MPEG-4 (Moving Picture Experts Group Phase-4, ISO/IEC14496) relating to a compressive coding method for audio-visual data has been established. For example, a transmission path having a band width of 64 kbit/sec can transmit video data having 176 pixels in the horizontal direction and 144 pixels in the vertical direction within one frame and a frame rate of 5~6 frames/sec, and audio data having a quality as high as telephone quality, simultaneously.

In a simple profile that is defined by the above-mentioned MPEG-4 video standard, as VOPs (Video Object Planes) corresponding to images of individual objects constituting one scene, I-VOPs and P-VOPs having different coding types are employed. To be specific, an I-VOP is a VOP whose video data is compressed or decompressed without referring to video data of other VOPs. Accordingly, coding or decoding of an I-VOP can be carried out independently of video data of other VOPs. On the other hand, a P-VOP is processed as follows. When performing compression or decompression of video data of a target P-VOP to be processed, predictive data is obtained by prediction on the basis of video data of an I-VOP or P-VOP that is positioned just before the target P-VOP, and a difference component between the predictive data and the video data of the target P-VOP is obtained, and the difference component so obtained is coded or decoded.

In digital satellite broadcasting using a broad band, the repetition cycle of I-VOP is usually about 0.5 sec, i.e., an I-VOP appears about every 0.5 sec. That is, in Japanese TV broadcasting, since the number of frames per sec is about 30, an I-VOP appears in every 15 frames. On the other hand, in a narrow band, the effect of improving the video quality is higher when the repetition cycle of I-VOP having a relatively large amount of codes of coded video data (coded data) is lengthened to increase the frequency of occurrence of P-VOP and B-VOP (i.e., VOPs which are coded or decoded with referring to video data of other VOPs) having a less amount of codes of coded data, than when the frequency of occurrence of I-VOP is increased. However, lengthening the repetition cycle of I-VOP, i.e., reducing the frequency of occurrence of I-VOP, is not desirable from the viewpoint of anti-error property, and it may cause image disordering to continue for a long time when a packet loss occurs. The above-mentioned VOPs in the MPEG-4 correspond to frames in MPEG-1 and MPEG-2.

Furthermore, the international standards organization 3GPP (Third Generation Partnership Project, http://www.3gpp.org) which defines the standard of receiving terminals in radio networks, provides that RTP/UDP/IP (Real-time Transport Protocol/User Datagram Protocol/Internet Protocol) is employed as a protocol for transmitting video data between a server and a receiving terminal, and RTSP/TCP/IP (Real-time Streaming Protocol/Transmission Control Protocol/Internet Protocol) is employed as a protocol for requesting data from a receiving terminal to a server. Furthermore, in the 3GPP standard, SMIL (Synchronization Multimedia Markup Language, http://www.w3.org) is available as a scene description language.

FIG. 18 shows a conventional data transmission system 20 for distributing video data using the Internet.

The data transmission system 20 comprises a server 20a for packetizing a video stream as the above-mentioned coded data, and transmitting packet data; a receiving terminal 20b for receiving the video stream, and reproducing video data; and a network 11, such as the Internet, for transmitting the packet data from the server 20a to the receiving terminal 20b.

In this data transmission system 20, initially, exchange of a message Mes for requesting data from the server 20a is carried out by the RTSP/TCP/IP between the receiving terminal 20b and the server 20a, whereby a data request signal Dau is transmitted from the receiving terminal 20b to the server 20a. Then, a video stream Dstr is transmitted from the server 20a to the receiving terminal 20b by the RTP/UDP/IP as a data transmission protocol. In the receiving terminal 20b, decoding of the received video stream Dstr is carried out, whereby video data is reproduced.

FIGS. 19(a) and 19(b) are diagrams for explaining a conventional video coding apparatus 100 which performs a coding process adapted to the MPEG standard, and FIG. 19(a) is a block diagram illustrating the construction of the apparatus 100.

The video coding apparatus 100 constitutes the server 20a shown in FIG. 18. The video coding apparatus 100 includes an encoder 102 which compressively codes original video data Dv as it is when coding an I-VOP while compressively coding difference data Dvd between the original video data Dv and its predictive data Dp when coding a P-VOP, and outputs coded data De; a decoder 103 which decompresses compressed data Dc and compressed difference data Dcd which have been obtained by compressing the original video data Dv and the difference data Dvd in the encoder 102, and outputs locally-decoded data Dd corresponding to the I-VOP and locally-decoded difference data Ddd corresponding to the P-VOP; and a subtracter 101 which performs subtraction between the original video data Dv and the predictive data Dp to generate the difference data Dvd.

The video coding apparatus 100 further includes an adder 104 which adds the predictive data Dp to the locally-decoded difference data Ddd to generate locally-decoded data Ddp corresponding to the P-VOP; and a frame memory 105 in which the locally-decoded data Dd corresponding to the I-VOP and the locally-decoded data Ddp corresponding to the P-VOP are stored as reference data. The video data read from the frame memory 105 is supplied to the subtracter 101 and the adder 104 as the predictive data Dp.

Next, the operation of the conventional video coding apparatus 100 will be described.

In the video coding apparatus 100, as shown in FIG. 19(b), an original video data Dv supplied from the outside is coded for every VOP.

For example, first VOP data V(1) is coded as an I-VOP, second to fifth VOP data V(2)~V(5) are coded as P-VOPs, sixth VOP data V(6) is coded as an I-VOP, and seventh to tenth VOP data V(7)~V(10) are coded as P-VOPs.

When coding is started, initially, the first VOP data V(1) is coded as an I-VOP. More specifically, the original video data Dv corresponding to an I-VOP is compressively coded by the encoder 102, and outputted as coded data De. At this time, compressed data Dc obtained by compressing the original video data Dv is outputted from the encoder 102 to the decoder 103. In the decoder 103, decompression of the compressed data Dc is carried out, whereby locally-decoded data Dd corresponding to the I-VOP is generated. The locally-decoded data Dd outputted from the decoder 103 is stored in the frame memory 105 as reference data.

Next, the second VOP data V(2) is coded as a P-VOP. More specifically, the original video data Dv corresponding to a P-VOP is inputted to the subtracter 101 which is placed before the encoder 102. In the subtracter 101, difference data Dvd between the original video data Dv corresponding to the P-VOP and video data which is read from the frame memory 105 as predictive data Dp is generated. Then, the difference data Dvd is compressively coded by the encoder 102, and outputted as coded data De.

Further, at this time, compressed difference data Dcd which is obtained by compressing the difference data Dvd is outputted from the encoder 102 to the decoder 103. In the decoder 103, decompression of the compressed difference data Dcd is carried out, whereby locally-decoded difference data Ddd is generated. In the adder 104, the locally-decoded difference data Ddd outputted from the decoder 103 is added to the predictive data Dp read from the frame memory 105, whereby locally-decoded data Ddp corresponding to the P-VOP is generated. The locally-decoded data Ddp outputted from the adder 104 is stored in the frame memory 105 as reference data.

Thereafter, the third to fifth VOP data V(3)~V(5) are coded as P-VOPs like the second VOP data. Further, the sixth VOP data V(6) is coded as an I-VOP like the first VOP data V(1), and the following seventh to tenth VOP data V(7)~V(10) are coded as P-VOPs like the second VOP data V(2).

As described above, in the video coding apparatus 100, coding of the original video data Dv is carried out with the I-VOP cycle being 5 VOPs.

FIG. 20 is a block diagram for explaining a conventional video decoding apparatus 200.

The video decoding apparatus 200 decodes the coded data De outputted from the video coding apparatus 100 shown in FIG. 19(a), and it constitutes a decoding section of the receiving terminal 20b in the data transmission system 20.

More specifically, the video decoding apparatus 200 includes a decoder 201 which performs decompressive decoding in VOP units on the coded data De outputted from the video coding apparatus 100, and outputs decoded data Dd corresponding to the original video data Dv when decoding an I-VOP while outputting decoded difference data Ddd corresponding to the difference data Dvd between the original video data Dv and its predictive data Dp when decoding a P-VOP; an adder 202 which adds the predictive data Dp to the decoded difference data Ddd to generate decoded data Ddecp corresponding to the P-VOP; and a frame memory 203 in which the decoded data Dd corresponding to the I-VOP and the decoded data Ddecp corresponding to the P-VOP are stored as reference data. The video data which is read from the frame memory 203 as the predictive data Dp is supplied to the adder 202.

Next, the operation of the video decoding apparatus 200 will be briefly described.

When decoding is started, in the video decoding apparatus 200, the coded data De supplied from the video coding apparatus 100 is decoded for every VOP.

More specifically, when the coded data De corresponding to the I-VOP is inputted to the decoder 201, decompressive decoding of the coded data De is carried out in the decoder 201, whereby decoded data Dd corresponding to the original video data Dv is generated. The decoded data Dd is outputted from the video decoding apparatus 200 and, simultaneously, stored in the frame memory 203 as reference data.

On the other hand, when the coded data De corresponding to the P-VOP is inputted to the decoder 201, decompressive decoding of the coded data De is carried out in the decoder 201, whereby decoded difference data Ddd corresponding to the difference data Dvd between the original video data Dv and the predictive data Dp is generated. When the decoded difference data Ddd is inputted to the adder 202, the decoded difference data Ddd is added to the video data which is read from the frame memory 203 as the predictive data Dp, whereby decoded data Ddecp corresponding to the P-VOP is generated. The decoded data Ddecp is outputted from the video decoding apparatus 200 and, simultaneously, stored in the frame memory 203 as reference data.

However, the conventional data transmission system 20 shown in FIG. 18 has the following drawbacks.

In particular, there are cases where the data outputted from the distribution server does not reach the receiving terminal, depending on the characteristics of the protocols. One of the causes of this accident is as follows. When a bit error occurs in a received packet, the received packet is discarded by an error detecting mechanism in the UDP. Especially in a transmission system which includes a radio transmission line in a transmission path from a server to a receiving terminal, when the radio wave intensity at the receiving terminal is weak, transmitted data received by the terminal cannot be normally demodulated, resulting in a bit error in the received data.

Further, at the receiving terminal, unless data (video stream) equivalent to one frame (VOP) is prepared (stored), decoding of the video frame cannot be carried out. Therefore, as a countermeasure against the occurrence of a transmission error, the following method is employed. When a transmission error occurs, data of a frame (VOP) which has not been normally received is discarded, and a video frame whose data has already been received normally is displayed until data of an I frame (I-VOP) is normally received after the occurrence of the transmission error. When data of an I frame has been received normally, decoding is resumed from this I frame. Although this method causes no image disordering, the motion of the display image is stopped until the reception of the I frame.

Furthermore, another method as a countermeasure against the occurrence of a transmission error is as follows. As a substitute for data of a frame (VOP) which has not been normally received, data of a just previous frame which has been normally received and decoded is used, and the data of this frame is used for decoding of subsequent frames. In this method, the motion of the display image is not stopped in the frames other than the frame whose data has not been normally received, whereby smooth display is performed. However, since data of a target frame (target of decoding) is decoded with reference to a frame different from the frame that was referred to in the coding process, the display contents might be greatly disordered. Although it depends on the viewer's preference, when a transmission error occurs, a reproduced (display) image in which the viewer feels less incongruity can be obtained by using the method of displaying the frame just before the transmission error until data of an I frame is normally received after the occurrence of the transmission error, than the method of replacing the data of the discarded reference frame corresponding to the target frame with data of a frame other than the reference frame.

However, the conventional receiving terminal has previously been set so as to execute either of the above-mentioned two methods as a countermeasure against the occurrence of a transmission error and, therefore, the viewer sometimes feels considerable incongruity in the image displayed when a transmission error occurs.

Furthermore, in order to suppress degradation in video quality due to data compression, the frequency of occurrence of I frame (I-VOP) should be reduced as low as possible. However, from the viewpoint that the decoding process which has been in the abnormal state due to the occurrence of the transmission error should be quickly resumed to the normal decoding state, the frequency of occurrence of I frame (I-VOP) cannot be significantly reduced.

SUMMARY OF THE INVENTION

The present invention is made to solve the above-described problems and has for its object to provide a data reproduction apparatus and a data reproduction method which can provide a display image on which the viewer hardly feels incongruity even when a transmission error occurs, and a data recording medium which contains a program for performing the data reproduction method by software.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data reproduction apparatus for receiving any of plural video data having different anti-error properties, and reproducing the received data, which apparatus comprises: an auxiliary data reception unit for receiving auxiliary data indicating anti-error intensities of the respective video data; a data designation unit for generating a data designation signal which designates one of the plural video data, on the basis of a condition relating to video data to be received, and the anti-error intensities of the respective video data which are indicated by the auxiliary data; a data transmission unit for transmitting the data designation signal; and a video data reception unit for receiving the video data which is selected from among the plural video data on the basis of the transmitted data designation signal, and then transmitted. Therefore, a video stream to be supplied to a receiving terminal can be selected so as to reduce the incongruity the user feels in a display image when a transmission error occurs.

According to a second aspect of the present invention, in the data reproduction apparatus according to the first aspect, each of the plural video data having different anti-error properties includes intra-frame coded data which is obtained by coding a digital video signal employing intra-frame pixel value correlation, and inter-frame coded data which is obtained by coding the digital video signal using inter-frame pixel value correlation, and the appearance intervals of intra-frame coded data in the respective video data are different from each other. Therefore, it is possible to select video data having an anti-error property that is suited to the occurrence status of transmission error or the preference of the user, by selecting the appearance interval of I frame in the video stream.

According to a third aspect of the present invention, in the data reproduction apparatus according to the first aspect, the plural video data having different anti-error properties are first and second coded video data which are obtained by coding a digital video signal; the first coded video data is packetized such that the coded data corresponding to one frame is packetized in units of data that is smaller than the frame; and the second coded video data is packetized such that the coded data corresponding to one frame is packetized for each frame or in units of data that is larger than the frame. Therefore, it is possible to perform switching between a video stream having a high resistance to transmission error and a video stream having a high video quality, by selecting the packet size of the coded video data.

According to a fourth aspect of the present invention, in the data reproduction apparatus according to the first aspect, the plural video data having different anti-error properties correspond to the same video sequence, and the frame rates of the respective video data are different from each other. Therefore, it is possible to perform switching between a video stream having a high resistance to transmission error and a video stream having a high video quality, by selecting the frame rate.

According to a fifth aspect of the present invention, in the data reproduction apparatus according to the first aspect, the plural video data having different anti-error properties correspond to the same video sequence, and the transmission protocols for the respective video data are different from each other. Therefore, any of the video data having different anti-error properties can be selected by selecting the protocol.

According to a sixth aspect of the present invention, the data reproduction apparatus according to the first aspect further includes a decoding unit for decoding the video data received by the video data reception unit; and a control unit for changing the operation mode of the decoding unit, according to a preset operation condition. Therefore, incongruity of a display image at the occurrence of a transmission error can be reduced by the setting of the operation condition.

According to a seventh aspect of the present invention, in the data reproduction apparatus according to the sixth aspect, each of the plural video data having different anti-error properties includes intra-frame coded data which is obtained by coding a digital video signal employing intra-frame pixel value correlation, and inter-frame coded data which is obtained by coding the digital video signal employing inter-frame pixel value correlation, and the appearance intervals of intra-frame coded data in the respective video data are different from each other; when the operation condition is to receive video data in which the appearance interval of intra-frame coded data is shorter than a predetermined value, the control unit sets the operation mode of the decoding unit to a first decoding mode in which, when a transmission error occurs, decoding is temporarily stopped until the intra-frame coded data is normally received; and when the operation condition is to receive video data in which the appearance interval of intra-coded data is equal to or longer than the predetermined value, the control unit sets the operation mode of the decoding unit to a second decoding mode in which, when a transmission error occurs, the inter-frame coded data is decoded excluding a portion which becomes undecodable due to the transmission error, until the intra-frame coded data is normally received. Therefore, the decoding operation at the occurrence of a transmission error can be changed to an operation mode having less incongruity of a display image, according to the setting of the operation condition.

According to an eighth aspect of the present invention, in the data reproduction apparatus according to the seventh aspect, the second decoding mode is a mode of decoding video data of frames other than a frame whose data is lost due to the occurrence of the transmission error. Therefore, even when a transmission error occurs, frames other than a frame whose data is lost due to the transmission error can be displayed, resulting in smooth image display.

According to a ninth aspect of the present invention, in the data reproduction apparatus according to the seventh aspect, the video data are packetized in units of data that is smaller than a frame; and the second decoding mode is a mode of decoding video data of packets other than a packet whose data is lost due to the occurrence of the transmission error. Therefore, when a transmission error occurs, even a frame whose portion is lost due to the transmission error can be partially displayed, resulting in smoother image display.

According to a tenth aspect of the present invention, there is provided a data reproduction apparatus for receiving any of plural video data having different anti-error properties, and reproducing the received data, which apparatus comprises: an auxiliary data reception unit for receiving auxiliary data indicating anti-error intensities of the plural video data; an error detection unit for detecting the incidence of error in the received video data; a data designation unit for generating a data designation signal which designates one of the plural video data, on the basis of the detected incidence of error in the received video data, and the anti-error intensities of the respective video data which are indicated by the auxiliary data; a data transmission unit for transmitting the data designation signal; and a video data reception unit for receiving video data which is selected from among the plural video data on the basis of the transmitted data designation signal, and then transmitted. Therefore, for example, the appearance interval of I frame in a video stream can be changed according to the incidence of transmission error, whereby incongruity of a display image at the occurrence of a transmission error can be minimized.

According to an eleventh aspect of the present invention, there is provided a data reproduction method for receiving any of plural video data having different anti-error properties, and reproducing the received data, which method comprises: an auxiliary data reception step of receiving auxiliary data indicating anti-error intensities of the plural video data; a data designation step of generating a data designation signal which designates one of the plural video data, on the basis of a condition relating to video data to be received, and the anti-error intensities of the respective video data which are indicated by the auxiliary data; a data transmission step of transmitting the data designation signal; and a video data reception step of receiving video data which is selected from among the plural video data on the basis of the transmitted data designation signal, and then transmitted. Therefore, a video stream to be supplied to a receiving terminal can be selected so as to reduce incongruity the user feels in a display image when a transmission error occurs, whereby the incongruity of the display image at the occurrence of the transmission error can be minimized.

According to a twelfth aspect of the present invention, there is provided a data reproduction method for receiving any of plural video data having different anti-error properties, and reproducing the received data, which method comprises: an auxiliary data reception step of receiving auxiliary data indicating anti-error intensities of the plural video data; an error detection step of detecting the incidence of error in the received video data; a data designation step of generating a data designation signal which designates one of the plural video data, on the basis of the detected incidence of error in the received video data, and the anti-error intensities of the respective video data which are indicated by the auxiliary data; a data transmission step of transmitting the data designation signal; and a video data reception step of receiving video data which is selected from among the plural video data on the basis of the transmitted data designation signal, and transmitted. Therefore, the appearance interval of I frame in a video stream can be changed according to the incidence of transmission error, whereby incongruity of a display image at the occurrence of a transmission error can be minimized.

According to a thirteenth aspect of the present invention, there is provided a data storage medium which contains a data reproduction program for making a computer execute a data reproduction process of receiving any of plural video data having different anti-error properties, and reproducing the received data, wherein the data reproduction program comprises: an auxiliary data reception step of receiving auxiliary data indicating anti-error intensities of the plural video data; a data designation step of generating a data designation signal which designates one of the plural video data, on the basis of a condition relating to video data to be received, and the anti-error intensities of the respective video data which are indicated by the auxiliary data; a data transmission step of transmitting the data designation signal; and a video data reception step of receiving video data which is selected from among the plural video data on the basis of the transmitted data designation signal, and transmitted. Therefore, it is possible to realize a decoding process which can minimize incongruity of a display image at the occurrence of a transmission error, by software, according to user setting or the like in a receiving terminal.

According to a fourteenth aspect of the present invention, there is provided a data storage medium which contains a data reproduction program for making a computer execute a data reproduction process of receiving any of plural video data having different anti-error properties, and reproducing the received data, wherein the data reproduction program comprises: an auxiliary data reception step of receiving auxiliary data indicating anti-error intensities of the plural video data; an error detection step of detecting the incidence of error in the received video data; a data designation step of generating a data designation signal which designates one of the plural video data, on the basis of the detected incidence of error in the received video data, and the anti-error intensities of the respective video data which are indicated by the auxiliary data; a data transmission step of transmitting the data designation signal; and a video data reception step of receiving video data which is selected from among the plural video data on the basis of the transmitted data designation signal, and transmitted. Therefore, it is possible to realize a decoding process which can minimize incongruity of a display image at the occurrence of a transmission error, with software, by changing the appearance interval of I frame according to the incidence of transmission error.

According to a fifteenth aspect of the present invention, there is provided a data reproduction apparatus for receiving video data and reproducing the received video data, which apparatus comprises: a video data reception unit for receiving the video data; a decoding unit for decoding the video data received by the video data reception unit; and a control unit for changing the operation mode of the decoding unit according to a preset condition. Therefore, when an error occurs, the operation mode of the decoding unit can be changed to a mode having less incongruity of a display image.

According to a sixteenth aspect of the present invention, the data reproduction apparatus according to the fifteenth aspect further includes an auxiliary data reception unit for receiving auxiliary data indicating the anti-error intensity of the video data. Therefore, when an error occurs, the operation mode of the decoding unit can be changed to a mode having less incongruity of a display image, on the basis of the anti-error intensity of the video data being received.

According to a seventeenth aspect of the present invention, in the data reproduction apparatus according to the sixteenth aspect, the video data includes intra-frame coded data which is obtained by coding a digital video signal using intra-frame pixel value correlation, and inter-frame coded data which is obtained by coding the digital video signal using inter-frame pixel value correlation; and the auxiliary data indicates the appearance interval of intra-frame coded data in the video data. Therefore, when an error occurs, the operation mode of the decoding unit can be changed to a mode having less incongruity of a display image, on the basis of the appearance interval of intra-frame coded data in the video data being received.

According to an eighteenth aspect of the present invention, in the data reproduction apparatus according to the fifteenth aspect, the video data includes intra-frame coded data which is obtained by coding a digital video signal using intra-frame pixel value correlation, and inter-frame coded data which is obtained by coding the digital video signal using inter-frame pixel value correlation; and the video data reception unit includes an arithmetic operation unit for calculating the appearance interval of intra-frame coded data in the video data. Therefore, when an error occurs, the operation mode of the decoding unit can be changed to a mode having less incongruity of a display image, on the basis of the appearance interval of intra-frame coded data in the video data being received.

According to a nineteenth aspect of the present invention, in the data reproduction apparatus according to the fifteenth aspect, the video data includes intra-frame coded data which is obtained by coding a digital video signal using intra-frame pixel value correlation, and inter-frame coded data which is obtained by coding the digital video signal using inter-frame pixel value correlation; when the video data reception unit receives video data in which the appearance interval of intra-frame coded data is shorter than a predetermined value indicated by the preset condition, the control unit sets the operation mode of the decoding unit at a first decoding mode in which, when a transmission error occurs, decoding is temporarily stopped until intra-frame coded data is normally received; and when the video data reception unit receives video data in which the appearance interval of intra-frame coded data is equal to or longer than the predetermined value indicated by the preset condition, the control unit sets the operation mode of the decoding unit at a second decoding mode in which, when a transmission error occurs, the video data is decoded excluding a portion which becomes undecodable due to the transmission error. Therefore, the decoding operation at the occurrence of the error can be changed to a mode having less incongruity of a display image, according to the preset condition at the receiving terminal end.

According to a twentieth aspect of the present invention, in the data reproduction apparatus according to the nineteenth aspect, the second decoding mode is a mode of decoding the video data corresponding to frames other than a frame whose data is lost due to the transmission error. Therefore, even when a transmission error occurs, frames other than a frame whose data is lost due to the transmission error can be displayed, resulting in smooth image display.

According to a twenty-first aspect of the present invention, in the data reproduction apparatus according to the nineteenth aspect, the video data is packetized in units of data that is smaller than a frame; and the second decoding mode is a mode of decoding the video data corresponding to packets other than a packet whose data is lost due to the transmission error. Therefore, when a transmission error occurs, even a frame whose data is lost due to the transmission error can be partially displayed, resulting in smoother image display.

According to a twenty-second aspect of the present invention, in the data reproduction apparatus according to the fifteenth aspect, the video data includes intra-frame coded data which is obtained by coding a digital video signal using intra-frame pixel value correlation, and inter-frame coded data which is obtained by coding the digital video signal using inter-frame pixel value correlation; and the control unit changes the decoding operation of the decoding unit when a transmission error occurs, according to a difference between a decoding time of a frame in which the transmission error occurs and a decoding time of an intra-frame coded frame to be decoded after the occurrence of the transmission error. Therefore, the decoding operation at the occurrence of a transmission error can be changed to a mode having lesser incongruity of an image to be displayed at the occurrence of the transmission error.

According to a twenty-third aspect of the present invention, in the data reproduction apparatus according to the twenty-second aspect, when a transmission error occurs, the control unit controls the decoding operation of the decoding unit so that decoding of the video data is stopped during a period from the decoding time of a frame in which the transmission error occurs to when decoding is performed on an intra-frame coded frame after the occurrence of the transmission error, in a first case where the time difference from the decoding time of the frame in which the transmission error occurs to the decoding time of the intra-frame coded frame to be decoded after the occurrence of the transmission error is smaller than a constant reference value indicated by the preset condition, and controls the decoding operation of the decoding unit so that decoding is performed on inter-frame coded data excluding a portion which becomes undecodable due to the transmission error during a period from the decoding time of a frame in which the transmission error occurs to when decoding is performed on an intra-frame coded frame after the occurrence of the transmission error, in a second case where the time difference from the decoding time of the frame in which the transmission error occurs to the decoding time of the intra-frame coded frame to be decoded after the occurrence of the transmission error is equal to or larger than the constant reference value indicated by the preset condition. Therefore, when a transmission error occurs, either a display without image disordering or a display with smooth motion, which display has lesser incongruity, can be carried out.

According to a twenty-fourth aspect of the present invention, in the data reproduction apparatus according to the twenty-third aspect, the decoding process to be performed in the second case is decoding the video data corresponding to frames other than a frame whose data is lost due to the occurrence of the transmission error. Therefore, when a time from when a transmission error occurs to when decoding of an intra-frame coded frame is carried out after the occurrence of the transmission error is relatively long, the decoding operation at the occurrence of the transmission error can be changed to a mode in which frames other than a frame whose data is lost due to the transmission error are displayed, resulting in smooth image display.

According to a twenty-fifth aspect of the present invention, in the data reproduction apparatus according to the twenty-third aspect, the video data is packetized in units of data that is smaller than a frame; and the decoding process to be performed in the second case is decoding the video data corresponding to packets other than a packet whose data is lost due to the occurrence of the transmission error. Therefore, when a time from when a transmission error occurs to when decoding of an intra-frame coded frame is carried out after the occurrence of the transmission error is relatively long, the decoding operation at the occurrence of the transmission error can be changed to a mode in which even a frame whose data is lost due to the transmission error is partially displayed, resulting in smoother image display.

According to a twenty-sixth aspect of the present invention, there is provided a data reproduction method for receiving video data and reproducing received video data, which method comprises: a video data reception step of receiving the video data; a decoding step of deciding the video data received in the video data reception step; and a control step of changing the operation mode of the decoding step according to a preset condition. Therefore, when an error occurs, the operation mode of the decoding unit can be changed to a mode having less incongruity of a display image.

According to a twenty-seventh aspect of the present invention, there is provided a data storage medium which contains a data reproduction program for making a computer execute a data reproduction process of receiving video data and reproducing the received video data, wherein the data reproduction program comprises: a video data reception step of receiving the video data; a decoding step of deciding the video data received in the video data reception step; and a control step of changing the operation mode of the decoding step according to a preset condition. Therefore, the decoding process in which the decoding mode is changed to a mode having less incongruity in a display image when a transmission error occurs can be implemented by software.

BRIEF DESCRIPTION OF THE DRAWINGS

FIG. 5(a) is a diagram illustrating description contents of an SMIL file FSD2 to be used by the data transmission system of the first embodiment, which file is different from the SMIL file shown in FIG. 2, and FIG. 5(b) is a diagram illustrating a specific method for selecting a video element on the basis of a user set value Xuse2.

FIG. 6(a) is a diagram illustrating a video stream in which one frame corresponds to one video packet, and FIG. 6(b) is a diagram illustrating a video stream in which one frame corresponds to three video packets, as examples of video data having different anti-error intensities according to the first embodiment.

FIG. 13(a) is a diagram illustrating description of an SMIL file indicating information relating to video streams having different transmission protocols, which is used for the second embodiment, FIG. 13(b) is a diagram illustrating contents stored in a work memory corresponding to the description, and FIG. 13(c) is a diagram illustrating a table on which the incidences of error are associated with the protocols.

FIG. 21(a) illustrates the construction of the system while FIG. 21(b) illustrates a data transmission process to be performed in the system.

DETAILED DESCRIPTION OF THE PREFERRED EMBODIMENTS

Figure 1:
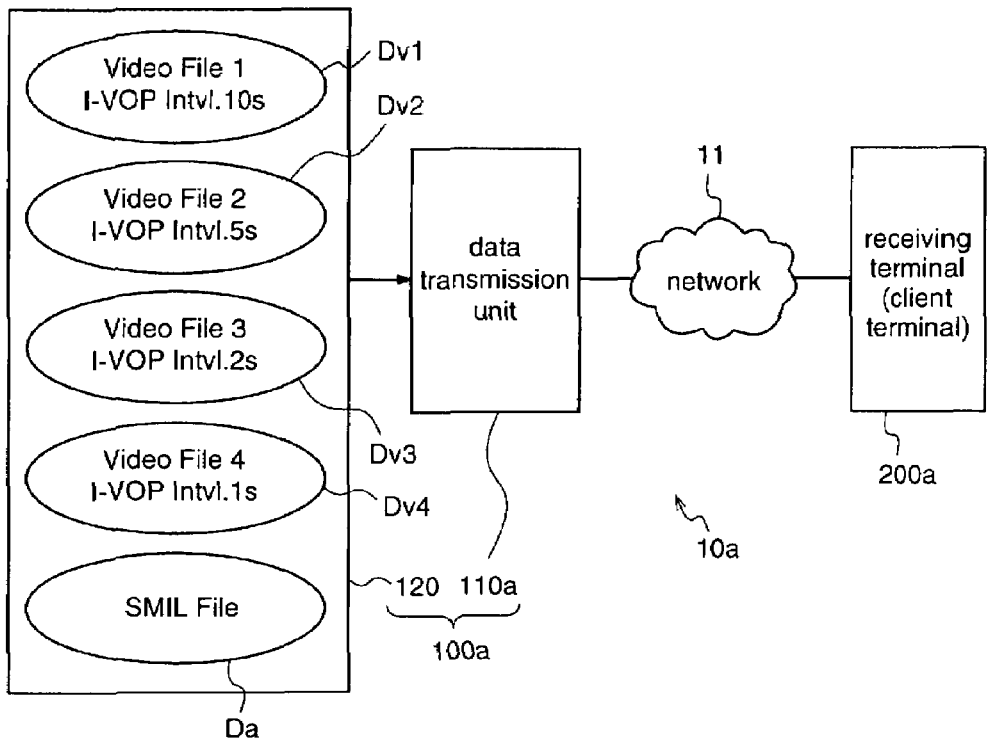
FIGS. 1(a) and 1(b) are diagrams for explaining a data transmission system according to a first embodiment of the present invention, illustrating the construction of the system (FIG. 1(a)), and a data transmission process in the system (FIG. 1(b)).
Figure 1:
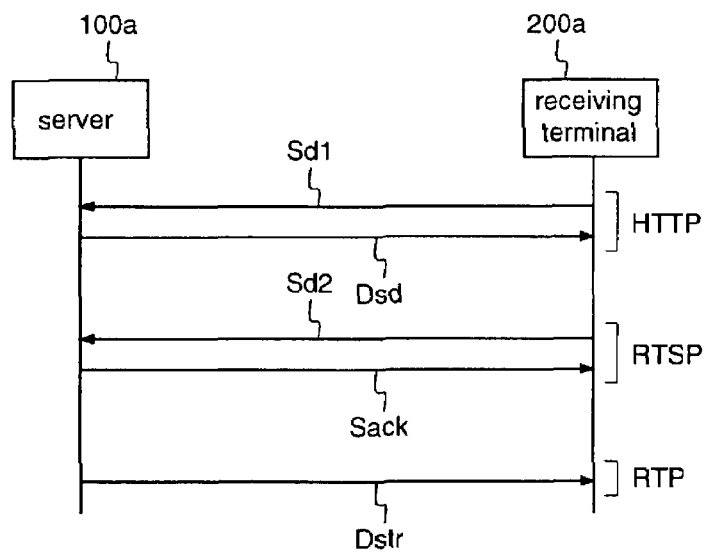

Hereinafter, preferred embodiments of the present invention will be described.

Embodiment 1

FIGS. 1(a) and 1(b) are diagrams for explaining a data transmission system 10a according to a first embodiment of the present invention, and FIG. 1(a) illustrates the construction of the system while FIG. 1(b) illustrates a data transmission process in the system.

The data transmission system 10a according to the first embodiment comprises a server 100a for outputting a predetermined video stream (coded video data); a receiving terminal (client terminal) 200a for receiving the video stream outputted from the server 100a, and reproducing video data; and a network 11 for transferring the video stream from the server 100a to the receiving terminal 200a.

The server 100a comprises a data storage unit 120 for holding plural video streams which are obtained by coding digital video signals corresponding to the same video sequence under different coding conditions, and holding SMIL data in which the attributes of the respective video streams are described; and a data transmission unit 110a for transmitting the data stored in the data storage unit 120 onto the network 11. Further, the data storage unit 120 is implemented by a bulk storage such as a hard disk.

In this first embodiment, the plural video streams are plural pieces of video data corresponding to the same video sequence and having different anti-error properties. More specifically, each of the plural video streams includes intraframe coded data having a relatively large amount of codes, which is obtained by coding a digital video signal using intra-frame pixel value correlation, and inter-frame coded data having a relatively small amount of codes, which is obtained by coding a digital video signal using inter-frame pixel value correlation. The appearance intervals of intraframe coded data in the respective video data, in other words, the I-frame (I-VOP) appearance intervals, are different from each other.

In the data storage unit 120 such as a hard disk, video streams having different I-frame intervals (i.e., I-frame intervals of 10 sec, 5 sec, 2 sec, and 1 sec) are stored as video files Dv1~Dv4, respectively, and an SMIL file FSD1 is stored as the SMIL data Da.

Figure 2:
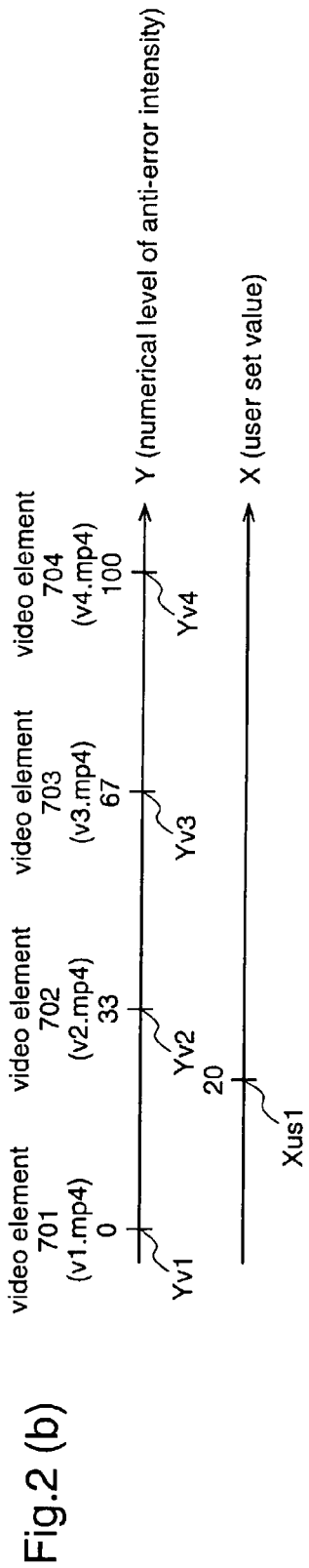
FIGS. 2(a) and 2(b) are diagrams illustrating an example of description contents of an SMIL file FSD1 which is used by the data transmission system of the first embodiment.

FIG. 2(a) shows the contents described in the SMIL file FSD1.

Character strings such as <smil>, </smil>, <body>, </body>, <switch>, </switch>, and <video>, which are described at the beginnings of the respective rows of the SMIL file FSD1, are called "elements", and each element declares the contents of description which follows the element.

For example, a smil element 710a and a /smil element 710b declare that the rows positioned between the row including the smil element and the row including the /smil element are described according to the SMIL standard.

Further, a body element 720a and a /body element 720b declare that the attributes of video data to be reproduced, for example, information indicating the address of the video data (URL), information relating to the coding parameter (the I-frame interval), and the like, are described in the rows positioned between the row including the body element and the row including the /body element.

Further, a switch element 730a and a /switch element 730b declare that a video element should be selected from among plural video elements which are positioned between the row including the switch element and the row including the /switch element. The video elements declare that motion picture data are specified by the descriptions in the rows 701~704 including the video elements.

For example, in the entry of each video element in the SMIL file FSD1, the I-frame appearance interval (I-frame cycle) is described as an i-frame-interval attribute, and a video element which is most suitable to the contents of the user setting is selected on the basis of the attribute. As specific values of the i-frame-interval attribute, there are "1s", "2s", "5s", and "10s", and a video data file with a smaller i-frame-interval attribute value has a higher anti-error intensity. While in this first embodiment four video data files having different I-frame appearance intervals are described, it is needless to say that 2, 3, 5 or more video data files may be employed.

The attribute value included in the entry of each video element is not restricted to the i-frame-interval attribute, and it may be a system-error-resilient-level attribute which directly indicates the anti-error intensity.

For example, FIG. 5(a) shows an SMIL file FSD2 indicating four video data files having different anti-error intensities, as another example of an SMIL file.

The SMIL file FSD2 includes entries relating to four video elements 711~714 having different anti-error intensities, which video elements are described between a row including a switch element 731a and a row including a /switch element 731b. In the entry of each video element, its anti-error intensity is described as a system-error-resilient-level attribute, and a video element which is most suitable to the contents of the user setting is selected on the basis of this attribute. The specific values of the system-error-resilient-level attributes in the respective video elements 711, 712, 713, and 714 are "1", "2", "3", and "4".

Figure 3:
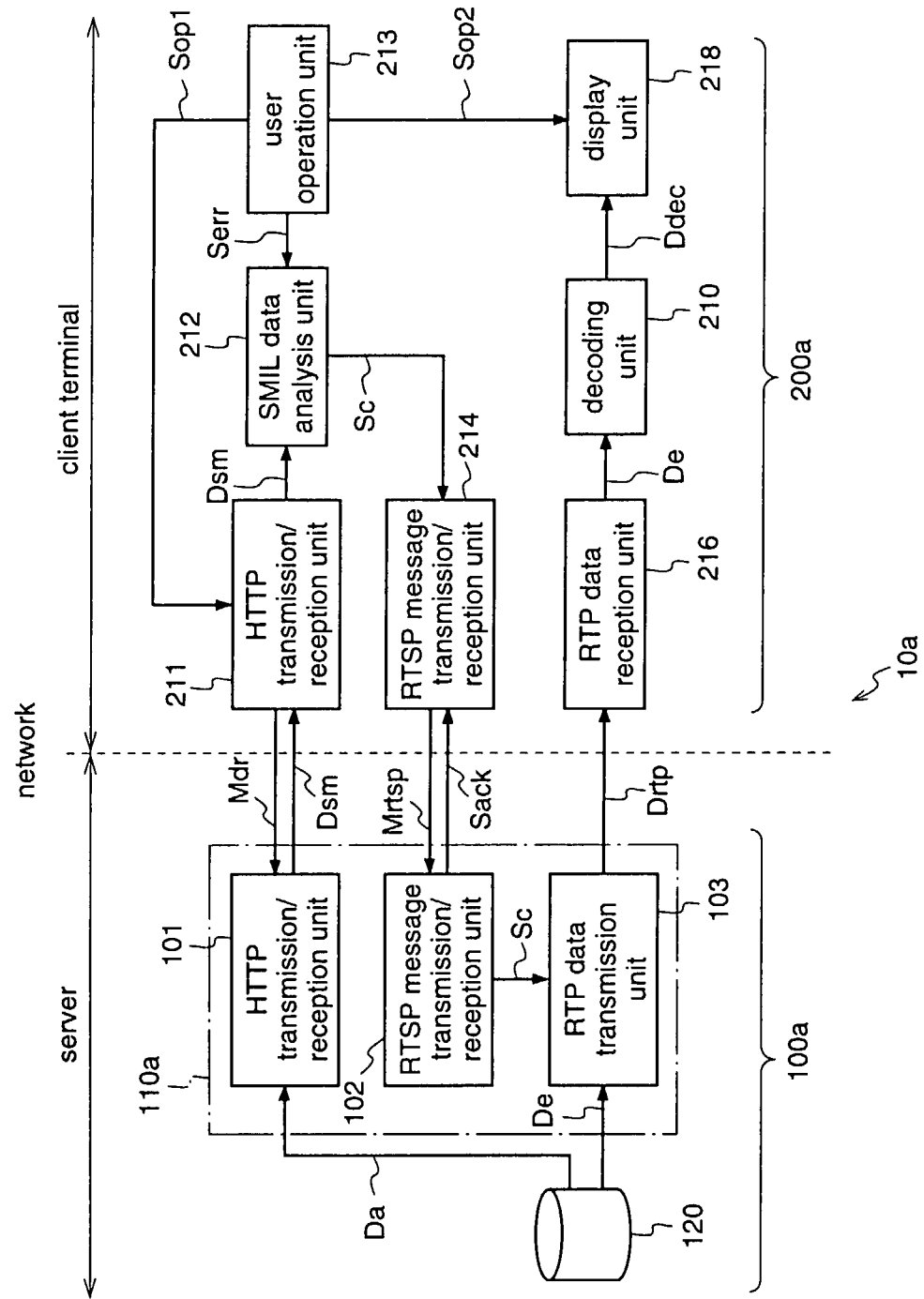
FIG. 3 is a block diagram illustrating the specific constructions of a server 100a and a client terminal 200a, which are components of the data transmission system of the first embodiment.

FIG. 3 is a block diagram illustrating the specific constructions of the server 100a and the client terminal 200a which are constituents of the data transmission system 10a.

A data transmission unit 110a constituting the server 100a comprises an HTTP transmission/reception unit 101 for receiving an SMIL data request message Mdr which is transmitted by HTTP from the client terminal 200a, reading an SMIL file Da from the data storage unit 120 according to the request, and transmitting the read SMIL file Da as SMIL data Dsm by HTTP; an RTSP message transmission/reception unit 102 for receiving a data request message Mrtsp transmitted by RTSP from the client terminal 200a, and outputting a data designation signal Sc indicating a requested video file title; and an RTP data transmission unit 103 for receiving the data designation signal Sc, reading a video stream De corresponding to the video file title indicated by the data designation signal Sc from the data storage unit 120, and transmitting the read video stream as RTP data Drtp by RTP.

On the other hand, the client terminal 200a includes a user operation unit 213 for outputting various kinds of user operation signals Sop1, Sop2, and Serr according to user operation; an HTTP transmission/reception unit 211 for transmitting the SMIL data request message Mdr by HTTP on the basis of the user operation signal Sop1, and receiving the SMIL data Dsm transmitted by HTTP from the server 100a; and an SMIL data analysis unit 212 for analyzing the SMIL data Dsm, and outputting a data designation signal Sc which designates predetermined data, on the basis of the analysis result, and the level signal Serr which indicates a specific level (numerical value) of an anti-error intensity set by the user operation.

The SMIL data analysis unit 212 determines desired video data among the plural video data having different I-frame intervals, which are stored at the server end, on the basis of the level signal Serr, and outputs a signal Sc which designates the determined video data.

The client terminal 200a further includes an RTSP message transmission/reception unit 214 for transmitting the data designation signal Sc as an RTSP message signal Mrtsp, and receiving an acknowledgement signal of the signal Mrtsp; an RTP data reception unit 216 for receiving the RTP data Drtp transmitted from the server 100a, and outputting a video stream De; a decoding unit 210 for decoding the video stream De, and outputting video data Ddec; and a display unit 218 for performing image display on the basis of the video data Ddec, and performing display according to the user operation signal Sop2.

Hereinafter, the construction for setting the anti-error property in the user operation unit 213 will be described specifically.

Figure 4:
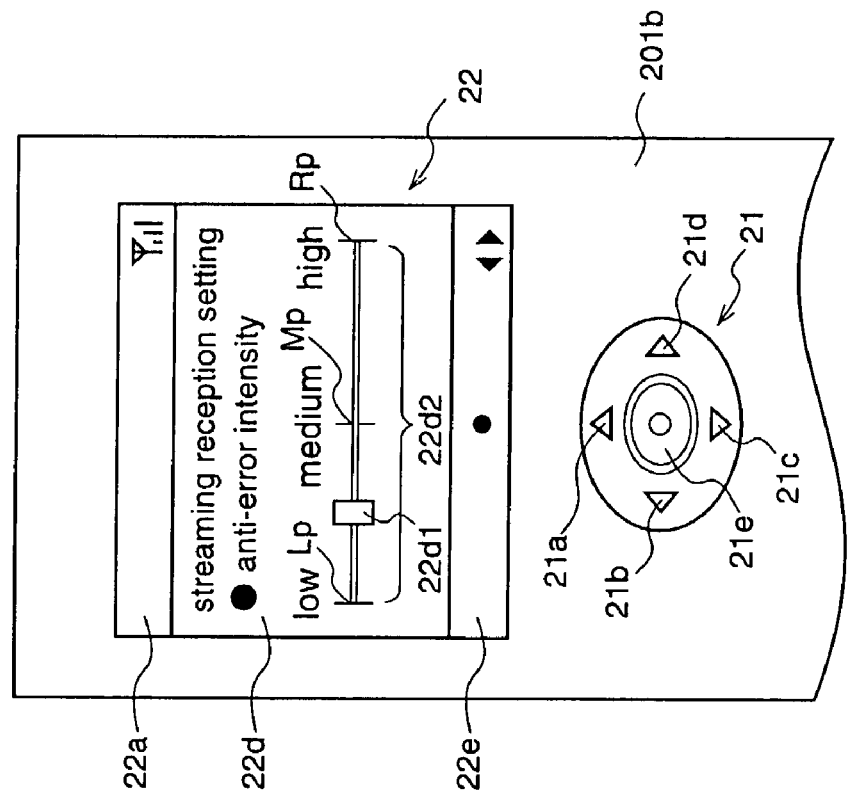
FIGS. 4(a) and 4(b) are diagrams for explaining a specific method for setting an anti-error intensity on the client terminal 200a, illustrating a method of selecting one from two anti-error intensities (FIG. 4(a)), and a method of designating an anti-error intensity using a slide bar (FIG. 4(b)).
Figure 4:
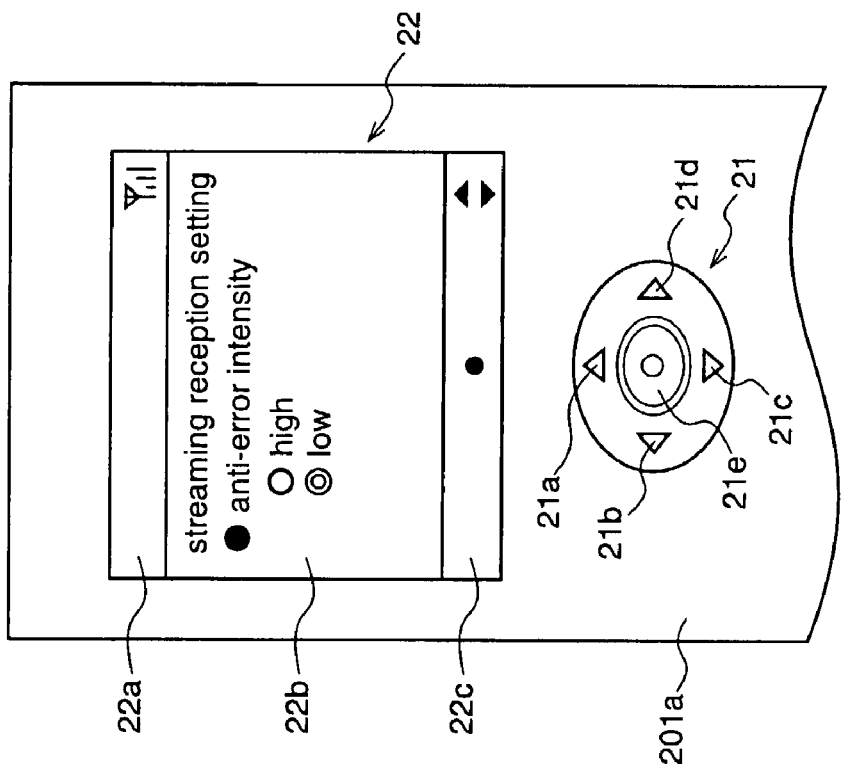

FIG. 4(*a*) shows a screen for setting an anti-error intensity of video data to be obtained (anti-error intensity setting screen), in the receiving terminal 200a. It is assumed that the receiving terminal 200a is a mobile terminal 201a such as a handy phone.

For example, the user selects an item [setting] for performing various kinds of initial settings, from among plural items in an initial menu of the mobile terminal 201a, using a button operation section 21 of the mobile terminal 201a, and furthermore, selects more specific items, i.e., an item [streaming reception setting] and an item [anti-error intensity setting] successively, whereby an anti-error setting screen 22b shown in FIG. 4(*a*) is displayed in the center of a display panel 22 of the mobile terminal 201a.

In FIG. 4(*a*), 22a denotes a screen indicating the radio wave intensity, and 22c denotes a screen for guiding the operation. It is shown in the screen 22c that one of the levels of anti-error intensities indicated in the anti-error intensity setting screen 22b should be selected by operating vertical cursor keys 21a and 21c of the button operation section 21, and then the selected level should be decided by operating a decision button 21e.

The anti-error intensity setting screen 22b is a screen on which either of predetermined anti-error intensities [high level] and [low level] is selected as a level of anti-error intensity of video data to be obtained. Further, in the mobile terminal 201a, the anti-error intensities [high level] and [low level] are associated with 80 and 20 among integral values 0~100, as anti-error intensity values, respectively. Then, either the anti-error intensity [high level] or the anti-error intensity [low level] is selected by user operation, i.e., by the operation with the vertical cursor keys 21a and 21c of the button operation unit 21, and the selected level is decided by the operation with the decision button 21e, whereby the anti-error intensity value corresponding to the decided level is held as the anti-error intensity value of the terminal 201a.

Next, the operation of the data transmission system 10a will be described.

In the data transmission system 10a, as shown in FIG. 1(*b*), an SMIL request signal Sd1 requesting SMIL data (SMIL request message Mdr shown in FIG. 3) is transmitted by HTTP from the receiving terminal 200a to the server 100a, and SMIL data Dsm is transmitted as an HTTP signal Dsd from the server 100a to the receiving terminal 200a in response to the request.

Thereafter, in the receiving terminal 200a, a message Mrtsp specifying a desired video stream is transmitted as an RTSP signal to the server 100a, on the basis of the result of analyzing the SMIL data Dsm, and the contents of the user setting. Then an acknowledgment signal Sack is transmitted by RTSP from the server 100a to the receiving terminal 200a and, thereafter, a predetermined video stream Dstr is transmitted as RTP data Drtp from the server 100a to the receiving terminal 200a.

Hereinafter, data transmission between the server 100a and the receiving terminal 200a will be described more specifically.

Initially, in the receiving terminal (client terminal) 200a, various kinds of settings are carried out by user operation onto the user operation unit 213 before making a request for SMIL data corresponding to desired video data.

For example, when the receiving terminal 200a is the mobile terminal 201a shown in FIG. 4(*a*), the user selects the item [setting] for performing various kinds of initial settings from among the plural items in the initial menu of the terminal, by using the button operation section 21 of the mobile terminal 201a, and furthermore, selects the more specific items [streaming reception setting] and [anti-error intensity setting] successively. Then, according to the operation signal Sop2, the anti-error intensity setting screen 22b shown in FIG. 4(*a*) is displayed on the display unit 218, i.e., the display panel 22 of the mobile terminal 201a.

On the anti-error intensity setting screen 22b, the anti-error intensity [high level] and the anti-error intensity [low level] are displayed as candidates of levels of anti-error intensities from which an anti-error intensity of video data to be obtained will be selected.

For example, when the anti-error intensity [low level] is selected by the user operation with the vertical cursor keys 21a and 21c of the button selection section 21 and then the selected [low level] is decided by the user operation with the decision button 21e, the integral value "20" corresponding to the anti-error intensity [low level] is held as the anti-error intensity value of the mobile terminal 201a.

When the user controls the display unit 218 of the receiving terminal 200a so as to display a video data selection screen (not shown) and specifies video data to be obtained in the video data selection screen, the control signal Sop1 corresponding to this operation is inputted to the HTTP transmission/reception unit 211, whereby a signal Sd1 (SMIL request message Mdr shown in FIG. 3) which requests SMIL data relating to the specified video data (refer to FIG. 1(*b*)) is transmitted from the HTTP transmission/ reception unit 211 to the server 100a. In the server 100a, the HTTP transmission/reception unit 101 receives the SMIL data request signal Sd1 supplied from the client terminal 200a, reads the SMIL file Da from the data storage unit 120 according to the SMIL data request signal Sd1, and transmits it as SMIL data Dsm by HTTP. The SMIL data Dsm is transmitted through the network 11 to the receiving terminal (client terminal) 200a to be received by the HTTP transmission/reception unit 211.

In the receiving terminal 200a, the received SMIL data Dsm is analyzed by the SMIL data analysis unit 212, and a video data file most suitable to the contents of the user setting is selected from among the four video data files, and a signal Sc designating the selected video data file is outputted to the RTSP message transmission/reception unit 214. The RTSP message transmission/reception unit 214 transmits the data designation signal Sc by RTSP, as an RTSP message signal Mrtsp, to the server 100a.

Hereinafter, a description will be given of the process of selecting a video data file corresponding to the anti-error intensity level that is set by the user, from among the four video data files described in the SMIL file, by the SMIL data analysis unit 212.

Initially, in the SMIL data analysis unit 212, the respective video elements 701~704 in the SMIL file are converted into numerical values.

To be specific, assuming that N (N: natural number) pieces of video elements are described in the SMIL file, a numerical value level Y (Y: integer not less than 0) is given to each video element on the basis of the following expression (1).

$$Y = 100 \cdot (n-1)/(N-1) \quad (1)$$

wherein the numerical level Y is a value to be given to a video element corresponding to a video data file whose anti-error intensity is in the n-th level in ascending order, among the N pieces of video elements.

When the value calculated by expression (1) is not an integral value, an integral value that is larger than and closest to the calculated value should be selected as a numerical value level Y.

In the above case, as N=4, integral values "100", "67", "33", and "0" are given to the four video elements 701~704 in descending order of the corresponding anti-error intensities. To be specific, an integral value Yv4 (=100) is given to the video element 704, an integral value Yv3 (=67) is given to the video element 703, an integral value Yv2 (=33) is given to the video element 702, and an integral value Yv1 (=0) is given to the video element 701.

When N=2, an integral value "100" is given to one of the two video elements which has the higher anti-error intensity while an integral value "0" is given to the other video element having the lower anti-error intensity. When N=3, integral values "100", "50", and "0" are given to the three video elements in descending order of the corresponding anti-error intensities. When N=5, integral values "100", "75", "50", "25", and "0" are given to the five video elements in descending order of the corresponding anti-error intensities.

Thereafter, the value (user set value) Xus1 (=20) of the anti-error intensity of the video data to be obtained, which is set on the mobile terminal by the user, is compared with the integral values given to the respective video elements 701~704, and the video element 702 which is given the integral value Yv2 (=33) closest to the user set value Xus1 (=20) is selected (refer to FIG. 2(b)).

As described above, in the receiving terminal 200a, a video data file according to the user setting at the receiving terminal is specified from among the video data files which are described in the SMIL file and have different anti-error properties, and the signal Sc indicating the designated video data file is transmitted as the RTSP message signal Mrtsp to the server 100a. In the server 100a, the RTSP message signal Mrtsp from the receiving terminal 200a is received by the RTSP message transmission/reception unit 102, and the data designation signal Sc is outputted to the RTP data transmission unit 103. In the transmission unit 103, a predetermined video file is selected from the plural video files stored in the data storage unit 120 on the basis of the data designation signal Sc, and transmitted as RTP data Drtp.

When the RTP data Drtp is transmitted through the network 11 to the receiving terminal 200a, the RTP data Drtp is received by the RTP data reception unit 216, and the video stream De is outputted to the decoding unit 210. In the decoding unit 210, the video stream De is decoded to generate video data Ddec, and the video data Ddec is outputted to the display unit 218. In the display unit 218, image display is carried out on the basis of the video data Ddec.

As described above, in the data transmission system 10a according to the first embodiment, the server 100a is provided with the data storage unit 120 which holds plural video streams having different I-frame appearance intervals as coded data of video data corresponding to the same video sequence, and the data transmission unit 110 which transmits a predetermined video stream among the plural video streams according to a data designation signal Sc from the receiving terminal 200a. On the other hand, the receiving terminal 200a transmits the data designation signal Sc which designates a video stream having a desired anti-error property among the plural video streams stored in the server 100a, to the server 100a, on the basis of the contents of the user setting. Therefore, it is possible to select a video stream to be supplied from the transmitting end to the receiving end, between a video stream having a high resistance to transmission error (anti-error intensity) and a video stream having a satisfactory video quality, according to the preference of the user.

While in this first embodiment <video> is used as a description element indicating a description relating to each video file in the SMIL data, <ref> may be used.

Further, while in this first embodiment RTSP is used as a protocol for making a data request and RTP is used as a protocol for transmitting video data, other protocols may be used.

Moreover, while in this first embodiment the information relating to the plural video streams having different coding conditions, which video streams are prepared at the server end, are included in the SMIL data to be transmitted, the information relating the plural video streams may be included in SDP (Session Description Protocol) data or MPEG-4 system data (scene description data employed in MPEG-4) to be transmitted.

Furthermore, while in the first embodiment the anti-error intensity of each video stream is indicated by the I-frame interval, the anti-error intensity may be indicated by other information for describing various kinds of anti-error modes which are defined by the MPEG-4 video coding standard.

For example, information for describing the anti-error mode of a video stream may be information indicating the size of video packets in the video stream, or information indicating whether HEC (Head Extension Code) is used or not (i.e., whether VOP header information is included in the header of each video packet or not). Further, it may be information indicating whether data partitioning (i.e., placement of important information at the head of each packet) is employed or not, or information indicating whether RVLC (Reversible Variable Length Code), i.e., a data structure in which a variable-length code can be decoded not only from the packet head but also from the packet end, is employed or not.

Furthermore, while in the first embodiment the i-frame-interval attribute and the system-error-resilient-level (also referred to as error-protection-level) attribute are described as the attributes included in the items of the respective video elements, these attribute values may be previously converted into integral values within a range of 0~100 in proportion to the levels of the anti-error intensities. In this case, it is not necessary to perform the above-mentioned process of converting the attribute values relating to the anti-error intensities into the integral values within a range of 0~100 at the receiving end.

Furthermore, while in the first embodiment the method of selecting either the anti-error intensity [high level] or the anti-error intensity [low level] (refer to FIG. 4(a)) is described as the method of setting the level of the anti-error intensity of the video data to be received, the method of setting the level of the anti-error intensity of the video data to be received may be a method of designating a level of an anti-error intensity within a predetermined range using a slide bar or the like.

FIG. 4(b) is a diagram for explaining a mobile terminal 201b for setting the level of anti-error intensity using a slide bar, illustrating an anti-error intensity setting screen 22d of the mobile terminal 201b. In FIG. 4(b), the same reference numerals as those shown in FIG. 4(a) denote the same parts.

For example, the user selects an item [setting] for performing various kinds of initial settings, from among plural items in an initial menu, by operating a button operation section 21 of the mobile terminal 201b in the same manner as the operation on the mobile terminal 201a according to the first embodiment, and then successively selects more specific items [streaming reception setting] and [anti-error intensity setting], whereby the anti-error intensity setting screen 22d shown in FIG. 4(b) is displayed in the center of a display panel 22 of the mobile terminal 201b, and a screen 22e for guiding the operation is displayed beneath the anti-error intensity setting screen 22d.

The anti-error intensity setting screen 22d is a screen on which the user can set a level of anti-error intensity of video data to be obtained, using a slide bar 22d1. Further, on the anti-error intensity setting screen 22d, a range 22d2 within which the user can move the slide bar in the horizontal direction is displayed, and a left-end position Lp and a right-end position Rp of the slide bar movable range 22d2 are a position designating an anti-error intensity [lowest level] and a position designating an anti-error intensity [highest level], respectively, and an intermediate point Mp between the left-end position Lp and the right-end position Rp is a position designating an anti-error intensity [middle level].

In the user operation unit 213 of the mobile terminal 201b, an integral value within a range of 0~100 is calculated as an anti-error intensity level according to the position of the slide bar, on the basis of the following expression (2).

$$X = Ls \cdot (1/Rs) \cdot 100 \quad (2)$$

wherein X is the anti-error intensity level, Rs is the distance (slide length) between the left-end position Lp and the right-end position Rp in the slide bar movable range 22d2, and Ls is the distance (slide distance) of the slide bar 22d1 from the left-end position Lp.

Assuming that the slide length Rs is 50 mm and the slide distance of the slide bar 22d1 is 15 mm, the anti-error intensity level X becomes Xus1 (=(15/50)·100=30) according to expression (2). When the value of the anti-error intensity level calculated by expression (2) is not an integral value, an integral value that is larger than and closest to the calculated value is selected as the anti-error intensity level X.

Further, the anti-error intensity setting screen 22e indicates that the level of the anti-error intensity should be specified by moving the slide bar 22d1 shown on the screen 22e with left and right cursor keys 21b and 21d of the button operation section 21, and the specified anti-error intensity level should be decided with a decision button 21e of the button operation section 21.

Then, the slide distance Ls of the slide bar 22d1 is specified by user operation with the left and right cursor keys 21b and 21d of the button operation unit 21, and the specified slide distance is decided by user operation with the decision button 21e, whereby the anti-error intensity X is calculated according to expression (2), and the calculated value is held as the anti-error intensity value of the mobile terminal 201b.

Also in this case, in the process of determining one from among plural video elements 711~714 on the basis of the anti-error intensity value (user set value) Xus1 (=30) of the video data to be obtained, which is set on the mobile terminal by the user, the video element 712 which is given an integral value Yv2 (=33) closest to the user set value Xus1 of the anti-error intensity is selected as described for the first embodiment (refer to FIG. 2(b)).

The process of determining one from among the video elements 711~714 on the basis of the user set value is not restricted to the above-mentioned process of selecting the video element which is given the integral value closest to the user set value Xus1. For example, as shown in FIG. 5(b), the video element 713 which is given an integral value Yv3 (=67) that is larger than the user set value Xus (=40) and closest to the set value may be selected.

While in this first embodiment the user sets the anti-error intensity of the video data to be obtained on the receiving terminal, the receiving terminal may automatically set the anti-error intensity of the video data to be received according to the condition of the received radio wave.

Moreover, in this first embodiment, as plural pieces of video data corresponding to the same video sequence and having different anti-error properties, those having different appearance intervals of coded data corresponding to I frames are described. However, plural pieces of video data having different anti-error properties may be those having different frame rates, different transmission protocols for the respective video data, or different sizes of data units when being packetized.

For example, video data having a higher frame rate has a higher anti-error intensity than that of video data having a lower frame rate, and video data transmitted by a transmission protocol which includes retransmission or forward error correction has a higher anti-error intensity than that of video data transmitted by a transmission protocol which includes no retransmission nor forward error correction. Furthermore, video data having a smaller data unit for packetization has a higher anti-error intensity that that of video data having a larger data unit for packetization.

Hereinafter, a description will be given of plural pieces of video data having different sizes of data units for packetization.

FIGS. 6(a) and 6(b) are diagrams illustrating first and second coded video data having different sizes of data units for packetization, which data are obtained by coding digital video signal Sdv, as two pieces of video data corresponding to the same video sequence and having different anti-error properties.

More specifically, the first coded video data D1 shown in FIG. 6(a) is data having a relatively low anti-error intensity, which is obtained by coding digital video signals corresponding to frames F1~F3 by an encoder Enc so that coded data corresponding to one frame is stored in one video packet VPa1. In the first coded video data D1 having a relatively low anti-error intensity, when a transmission error occurs during transmission of coded data corresponding to the frame F2, the coded data stored in the packet VPa1 including the error portion Perr, i.e., the coded data of the frame F2, cannot be decoded.

Further, the second coded video data D2 shown in FIG. 6(b) is data having a relatively high anti-error intensity, which is obtained by coding digital video signals corresponding to frames F1~F3 by an encoder Enc so that coded data corresponding to one frame is stored over three video packets VPb1~VPb3. In the second coded video data D2 having a relatively high anti-error intensity, even when a transmission error occurs during transmission of coded data corresponding to the frame F2, only the coded data corresponding to the packet VPb3 including the error portion Perr cannot be decoded while the coded data corresponding to the other packets VPb1 and VPb2 can be decoded.

Embodiment 2

Figure 7:
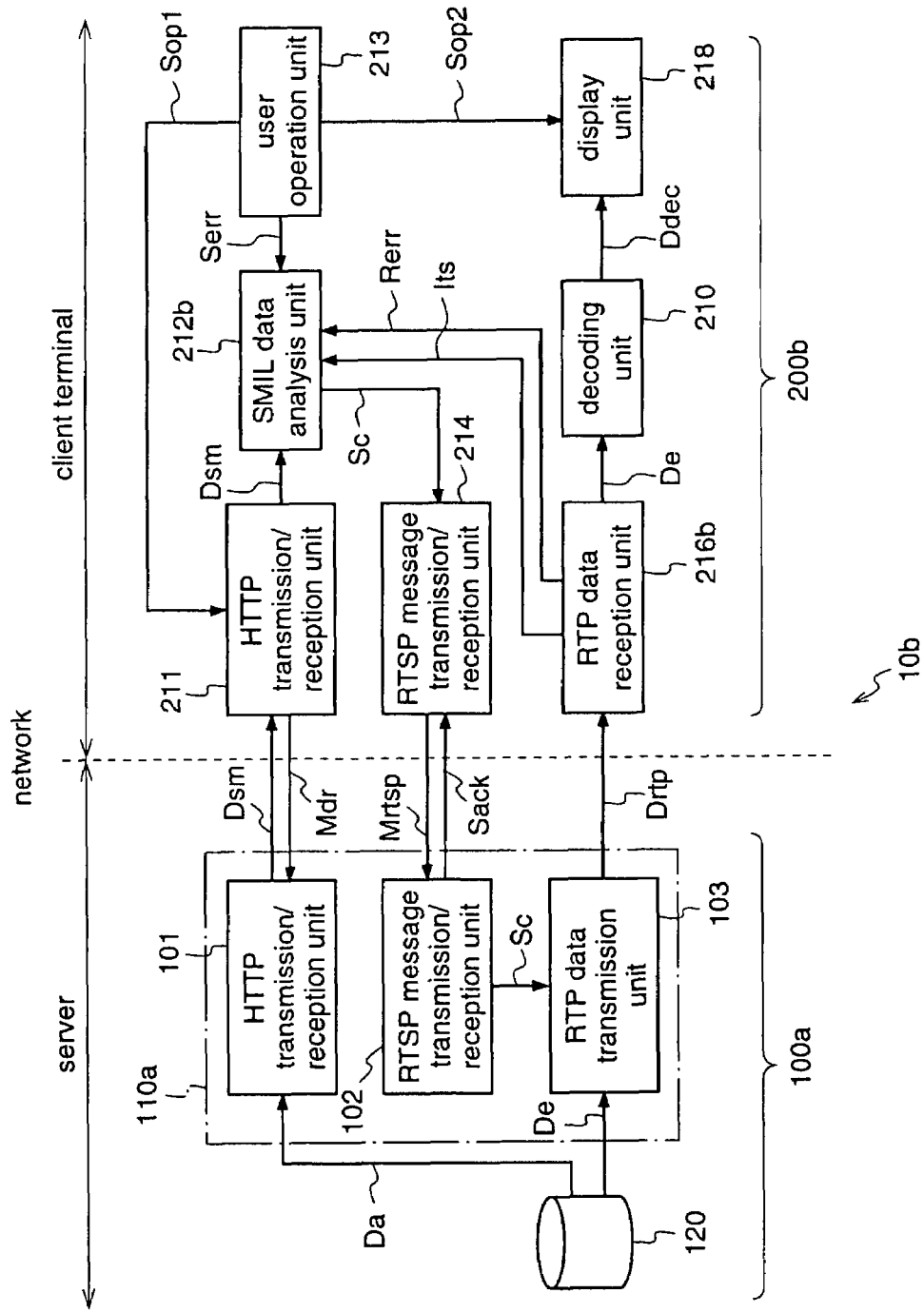
FIG. 7 is a block diagram for explaining a data transmission system according to a second embodiment of the present invention, illustrating the specific constructions of a server and a client terminal which are components of the system.

FIG. 7 is a block diagram for explaining a data transmission system 10b according to a second embodiment of the present invention, illustrating the constructions of a server and a client terminal in the system 10b.

The data transmission system 10b according to the second embodiment is provided with a client terminal (receiving terminal) 200b instead of the client terminal 200a of the data transmission system 10a according to the first embodiment. The client terminal 200b of this second embodiment determines a video stream having an optimum anti-error intensity on the basis of an anti-error intensity of video data to be received, which is set by the user, and the incidence of transmission error in RTP data Drtp from a server 100a, and then transmits a signal Sc designating the determined video stream to the server 100a.

To be specific, in the receiving terminal 200b, video data to be initially received is selected from among plural video data files shown in an SMIL file on the basis of the anti-error intensity set by the user and, after data reception has started, video data having a predetermined anti-error intensity, which is being received, is switched to video data selected from the plural video data file shown in the SMIL file according to the incidence of error in the received video data.

Hereinafter, the receiving terminal 200b according to the second embodiment will be described more specifically.

The receiving terminal 200b includes an RTP data reception unit 216b and an SMIL data analysis unit 212b which performs different operations from those of the RTP data reception unit 216 and the SMIL data analysis unit 212 of the receiving terminal 200a according to the first embodiment, respectively. In the receiving terminal 200b, an HTTP transmission/reception unit 211, an RTSP message transmission/reception unit 214, a decoding unit 210, a user operation unit 213, and a display unit 218 are identical to those of the receiving terminal 200a of the first embodiment.

The RTP data reception unit 216b receives RTP data Drtp, and outputs time stamp information Its of RTP packets in the RTP data Drtp. Further, the unit 216b detects the incidence of transmission error in the RTP data, and outputs an error signal Rerr indicating the incidence of transmission error. Further, the SMIL data analysis unit 212b outputs a designation signal Sc for switching a video stream supplied from the server 100a as RTP data to another video stream having a different coding condition (i.e., anti-error intensity), according to a result of comparison between the incidence of error that is indicated by the error signal Rerr and a predetermined threshold value, to the RTSP message transmission/reception unit 214. The threshold value is a unique reference value which has previously been set on the receiving terminal 200b.

In the RTP data reception unit 216b, the rate of packet loss is calculated as the incidence of error on the basis of sequence number information included in the headers of the RTP packets (RTP data). Further, in the SMIL data analysis unit 212b, a designation signal Sc for selecting a video stream having a relatively short I-frame interval is outputted when the rate of packet loss is increasing, and a designation signal Sc for selecting a video stream having a relatively long I-frame interval is outputted when the rate of packet loss is low.

Hereinafter, calculation of the incidence of error will be described more specifically.

The RTP packets are assigned continuous sequence numbers in order of packet transmission, which sequence numbers are indicated by sequence number information included in the headers of the respective RTP packets. The RTP reception unit 216b calculates the total number Na of RTP packets to be received for every predetermined unit time, according to the sequence number of an RTP packet which is received first within the unit time and the sequence number of an RTP packet which is received finally within the unit time, and counts the total number Nr of RTP packets which are actually received within this unit time, and calculates the incidence of error Erate at this time according to the following expression (3).

$$Erate = Nr/Na \tag{3}$$

Next, the operation of the data transmission system 10b will be described.

The operation of the data transmission system 10b according to this second embodiment is identical to the operation of the data transmission system 10a of the first embodiment except the operations of the SMIL data analysis unit 212b and the RTP data reception unit 216b of the receiving terminal 200b.

To be specific, in the receiving terminal 200b, as in the receiving terminal 200a of the first embodiment, various kinds of settings are carried out by user operation with the user operation unit 213 before making a request for SMIL data corresponding to desired video data.

That is, the user sets the level of anti-error intensity of video data to be received, on an anti-error intensity setting screen 22b shown in FIG. 4(a). When the user performs an operation for specifying the video data to be obtained on a video data selection screen (not shown), an operation signal Sop1 according to this operation is inputted to the HTTP transmission/reception unit 211, whereby a signal Sd1 for requesting SMIL data relating to the specified video data (SMIL request message Mdr) is transmitted from the HTTP transmission/reception unit 211 to the server 100a (refer to FIG. 1(b)).

In the server 100a, the SMIL data request signal Sd1 from the receiving terminal 200b is received by the HTTP transmission/reception unit 101. Then, the HTTP transmission/ reception unit 101 reads an SMIL file Da corresponding to the SMIL data request signal Sd1 from the data storage unit 120, and transmits it as SMIL data Dsm by HTTP. The SMIL data Dsm is transmitted through the network 11 to the receiving terminal 200b to be received by the HTTP transmission/reception unit 211.

In the receiving terminal 200b, the received SMIL data Dsm is analyzed by the SMIL data analysis unit 212b, and a video data file most suitable to the contents of the user setting is selected from among the four video data files, and a designation signal Sc designating the selected video data file is outputted to the RTSP message transmission/reception unit 214. In the RTSP message transmission/reception unit 214, the designation signal Sc is transmitted to the server 100a as an RTSP message signal Mrtsp.

In the server 100a, the RTSP message signal Mrtsp from the receiving terminal 200b is received by the RTSP message transmission/reception unit 102, and the designation signal Sc is outputted to the RTP data transmission unit 103. Then, the transmission unit 103 selects a predetermined video file from among the plural video files stored in the data storage unit 120, on the basis of the designation signal Sc, and transmits it as RTP data Drtp.

When the RTP data Drtp is transmitted through the network 11 to the receiving terminal 200b, the RTP data Drtp is received by the RTP data reception unit 216b, and a video stream De is outputted to the decoding unit 210. In the decoding unit 210, video data Ddec is generated by decoding the video stream De, and outputted to the display unit 210. In the display unit 218, image display is carried out on the basis of the video data Ddec.

Under the state where the RTP data Drtp is being transmitted from the server 100a to the receiving terminal 200b, the incidence of transmission error in the TRP data Drtp is detected by the RTP data reception unit 216b, and an error signal Rerr indicating the incidence of error is outputted to the SMIL data analysis unit 212b.

Then, the SMIL data analysis unit 212b outputs a designation signal Sc for switching the video stream supplied from the server 100a as the RTP data to another video stream having a different coding condition (i.e., anti-error intensity), according to a result of comparison between the incidence of error that is indicated by the error signal Rerr and a predetermined threshold value that is a reference value unique to the receiving terminal 200b, to the RTSP message transmission/reception unit 214. In the RTSP message transmission/reception unit 214, the designation signal Sc is transmitted as an RTSP message signal Mrtsp by RTSP to the server 100a.

In the server 100a, the RTSP message signal Mrtsp from the receiving terminal 200b is received by the RTSP message transmission/reception unit 102, and the designation signal Sc is outputted to the RTP data transmission unit 103. In the transmission unit 103, a video file designated by the designation signal Sc is selected from among the plural video files stored in the data storage unit 120 to be transmitted as RTP data Drtp.

Hereinafter, a description will be given of the process of calculating the incidence of error during transmission of the video data, and the process of switching the stream according to the calculated incidence of error.

The SMIL data analysis unit 212b includes a work memory (not shown) which holds information relating to the respective video elements described in the SMIL file, and information indicating the reception states of the video data (video streams) corresponding to the respective video elements.

Figure 8:
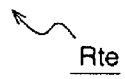
FIG. 8(a) is a diagram illustrating contents stored in a work memory, corresponding to the description of the SMIL file FSD2 used for the second embodiment.
FIG. 8(b) is a diagram illustrating a table on which the incidences of error are associated with the anti-error intensities.

FIG. 8(a) illustrates information recorded in the work memory.

In the work memory, information relating to the video elements 711~714 in the SMIL file FSD2 shown in FIG. 5(a) are recorded, and the number entries recorded in this memory is equal to the number of elements (i.e., number of video elements) described between the <switch> element 731a and the </switch> element 731b in the SMIL file FSD2.

As shown in FIG. 8(a), each entry includes a URL (server address) indicating the address of the corresponding video stream on the network; an anti-error intensity possessed by the corresponding video stream; an execution flag indicating whether the corresponding video stream is in the received (reproduced) state where the stream is received and reproduced or in the unreceived (unreproduced) state where the stream is not received nor reproduced; and a latest time stamp relating to the corresponding video stream.

In an entry E2 having an entry number [2], the value of the execution flag is "1", which means that the video stream corresponding to this entry E2 is currently being received (reproduced). Further, in entries E1, E3, and E4 having entry numbers [1], [3], and [4], the values of the execution flags are "0", which means that the video streams corresponding to these entries E1, E3, and E4 are not received (reproduced) currently.

Further, the values of the anti-error intensities in the entries E1~E4 are "0", "33", "67", and "100", respectively, and these values are calculated on the basis of the values of the system-error-resilient-level attributes in the SMIL file FSD2, using expression (1), as described for the first embodiment.

The latest time stamps in the entries E1~E4 are updated at any time according to the time stamps given to the headers of the most-recently received RTP packets, and these time stamps are used for determining a data request timing when a video stream corresponding to a specific entry is switched to a video stream corresponding to another entry.

In FIG. 8(a), the values of the latest time stamps in the entries E1, E3, and E4 are "0", which means that the video streams corresponding to these entries have not yet been received. Further, the value of the latest time stamp in the entry E2 is "3060000". Since, in MPEG-4, time stamps are set using a clock of 90 kHz, this value "3060000" is equivalent to 34 sec.

FIG. 8(b) shows the relationship between the incidence of error and the anti-error intensity, in the receiving terminal 200b.

Information relating to this relationship is stored in an information storage section (not shown) in the SMIL data analysis unit 212b, as table information Rte that is unique to the receiving terminal. In the table information Rte, the incidence of error (threshold value) Eth (Eth=0(%)) corresponds to a video stream having the lowest level of anti-error intensity, Eth (0<Eth≦3(%)) corresponds to a video stream having a numerical level of "30" as an anti-error intensity, Eth (3<Eth≦6(%)) corresponds to a video stream having a numerical level of "60" as an anti-error intensity, and Eth (6<Eth(%)) corresponds to a video stream having the highest level of anti-error intensity. That is, in the table information Rte, the incidence of error, 0%, 3%, or 6%, is the threshold value when switching the video stream according to the incidence of error.

Next, a description will be given of the operation of the SMIL data analysis unit 212b when switching the video stream according to variation in the incidence of error.

It is assumed that the set value Xus2 of the anti-error intensity in the receiving terminal is "40" as shown in FIG. 5(b), and a video stream having a numerical level of anti-error intensity, which is closest to the anti-error intensity set value Xus2, should be selected as a video stream to be received, from among the video streams corresponding to the respective video elements described in the SMIL file FSD2. The numerical levels Y of anti-error intensities which are given to the respective video elements described in the SMIL file FSD2 are calculated according to the above-mentioned expression (1). That is, an integral value Ys4 (=100) is given to the video element 714, an integral value Ys3 (=67) is given to the video element 713, an integral value Ys2 (=33) is given to the video element 712, and an integral value Ys1 (=0) is given to the video element 711. Accordingly, the receiving terminal 200b requests, as a video stream to be received initially, the video stream corresponding to the video element 712 and having the numerical level Ys2 (=33) of anti-error intensity, and receives the video stream.

First of all, in the SMIL data analysis unit 212b of the receiving terminal 200b, the value "1" of the execution flag corresponding to the entry [2] is written in the work memory.

Then, in the RTSP message transmission/reception unit 214 of the receiving terminal 200b, a data request message which requests the video stream corresponding to the entry [2], i.e., the video stream corresponding to the video element 712, is transmitted by RTSP.

When the video stream corresponding to the video element 712 is inputted to the receiving terminal 200b, this video stream is received by the RTP data reception unit 216b, and the time stamp information Its of the initially-received RTP packet corresponding to the video stream is outputted to the SMIL data analysis unit 212b.

In the SMIL data analysis unit 212b, the value of the time stamp corresponding to the entry [2], which is stored in the work memory, is successively updated to the latest value.

Then, the reception status is observed for a predetermined period of time (e.g., 10 sec) in the RTP data reception unit 216b. When the incidence of error is zero as a result of observation, in the SMIL data analysis unit 212b, a video stream having the lowest anti-error intensity is selected from among the video streams shown in the SMIL file on the basis of the table information Rte shown in FIG. 8(b), and a designation signal which designates this video stream as video data to be received is outputted to the RTSP message transmission/reception unit 214.

At this time, in the SMIL data analysis unit 212b, the value of the execution flag corresponding to the entry [2] is changed to "0", and the value of the execution flag corresponding to the entry [1] is changed to "1".

Thereafter, in the RTSP message transmission/reception unit 214, a data request is outputted by RTSP to the URL (server address) corresponding to the entry [1] and, at this time, the beginning position of the requested data (video stream) is specified on the basis of the latest time stamp corresponding to the entry [2].

Figure 9:
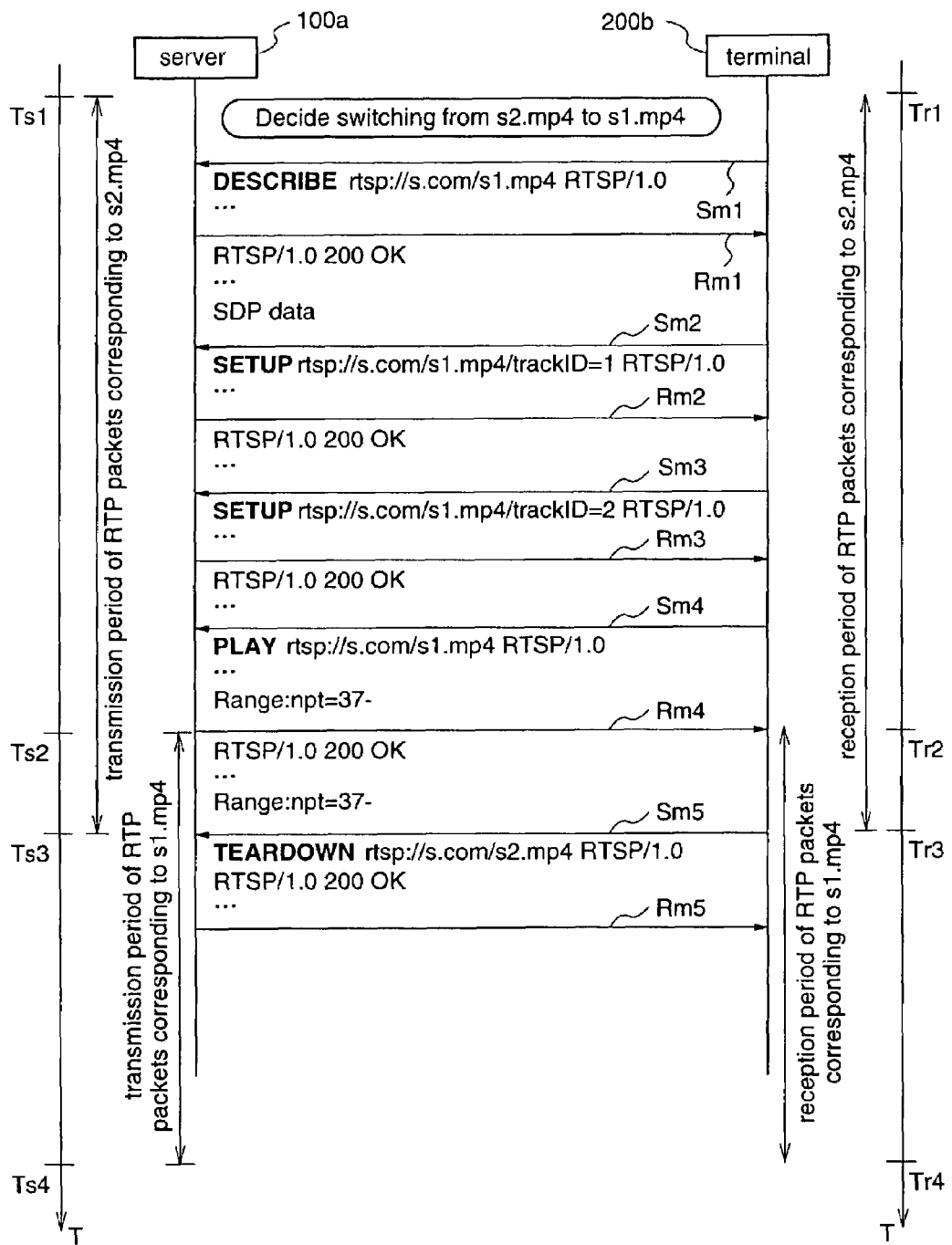
FIG. 9 is a diagram illustrating an example of RTSP message exchange, when performing video stream switching according to the second embodiment.

FIG. 9 is a diagram illustrating an example of a sequence by RTSP, i.e., message exchange.

When performing switching of the video stream, initially, a DESCRIBE request message (DESCRIBE rtsp://s.com/s1.mp4 RTSP/1.0) Sm1 corresponding to the video stream indicated by the video element 711 is transmitted by RTSP from the RTSP message transmission/reception unit 214 of the receiving terminal 200b to the URL (server address) corresponding to the entry [1]. Then, a response message (RTSP/1.0 200 OK) Rm1 to the DESCRIBE request message Sm1 is transmitted from the RTSP message transmission/reception unit 102 of the server 100a corresponding to the URL to the receiving terminal 200b. This response message Rm1 includes SDP data Dsd corresponding to the video stream indicated by the video element 711.

Subsequently, a first SETUP request message (SETUP rtsp://s.com/s1.mp4/trackID=1 RTSP/1.0) Sm2 and a second SETUP request message (SETUP rtsp://s.com/s1.mp4/trackID=2 RTSP/1.0) Sm3 corresponding to the video stream indicated by the video element 711 are transmitted by RTSP from the RTSP message transmission/reception unit 214 of the receiving terminal 200b to the URL (server address) corresponding to the entry [1]. Then, response messages (RTSP/1.0 200 OK) Rm2 and Rm3 to the first and second SETUP request messages Sm2 and Sm3 are transmitted from the RTSP message transmission/reception unit 102 of the server 100a corresponding to the URL to the receiving terminal 200b.

Thereafter, a PLAY request message (PLAY rtsp://s.com/s1.mp4 RTSP/1.0) Sm4 corresponding to the video stream indicated by the video element 711 is transmitted by RTSP from the RTSP message transmission/reception unit 214 of the receiving terminal 200b to the URL (server address) corresponding to the entry [1]. At this time, the beginning position of the requested data is specified by information (Range:npt=37–). Since the time stamp value of the most-recently received RTP packet corresponding to the video stream that is currently being received indicates that the display time of the video stream is 34 sec, the beginning position of the requested data should be set in a position after 34 sec. In this example, assuming that the delay time in the process of switching the video stream is about 3 sec, the beginning position of the requested position is set at a position where the display time is 37 sec.

A response message (RTSP/1.0 200 OK) RM4 to the PLAY request message Sm4 is transmitted from the RTSP message transmission/reception unit 102 of the server 100a corresponding to the URL to the receiving terminal 200b. At this time, transmission of the RTP packets of the video stream (video element 711) by RTP from the RTP transmission unit 103 is started in the server 100a (time Ts2) and, simultaneously, reception of the RTP packets by the RTP data reception unit 216b is started in the receiving terminal 200a (time Tr2).

Furthermore, in the RTSP message transmission/reception unit 214, it is judged whether the time stamp of the RTP packet corresponding to the entry [1], which is received by the RTP data reception unit 216b, is smaller than the time stamp of the RTP packet corresponding to the entry [2] or not. When the time stamp of the RTP packet corresponding to the entry [1] is smaller than the time stamp of the RTP packet corresponding to the entry [2], a TEARDOWN request message Sm5 is issued to the server corresponding to the entry [2] and, simultaneously, reception of the RTP packets corresponding to the entry [2] is stopped (time Tr3).

In other words, only when the display time (T1) which is calculated from the time stamp value of the initially-received RTP packet corresponding to the video stream (s1.mp4) is smaller than the display time (T2) which is calculated from the time stamp value of the most-recently received RTP packet corresponding to the video stream (s2.mp4), the RTP data reception unit 216b stops reception of the RTP packets corresponding to the video stream (s1.mp4). Thereby, when switching the video stream, reproduction of the video stream after the switching is carried out without interruption after reproduction of the video stream before the switching.

In the server 100a corresponding to the entry [2], the RTP data transmission unit 103 stops transmission of the RTP packets corresponding to the entry [2] (time Ts3) on receipt of the TEARDOWN request message (TEARDOWN rtsp://s.com/s2. mp4 RTSP/1.0) Sm5, and transmits a response message Rm5 to the TEARDOWN request message Sm5 to the receiving terminal 200b.

In the receiving terminal 200b, the RTP data reception unit 216b discards the RTP packets corresponding to the entry [2], which packets have the same time stamps as the time stamps of the RTP packets corresponding to the entry [1].

On the other hand, when the incidence of error becomes 5% in the observation of the reception status, a video stream whose numerical level of anti-error intensity is closest to "60" is selected on the basis of the table information Rte shown in FIG. 8(b), and the video stream being received is switched to the video stream corresponding to the entry [3].

In FIG. 9, time Ts1 is the transmission start time of the video stream (s2.mp4), time Ts4 is the transmission stop time of the video stream (s1.mp4), time Tr1 is the reception start time of the video stream (s2.mp4), and Tr4 is the reception stop time of the video stream (s1.mp4).

Figure 10:
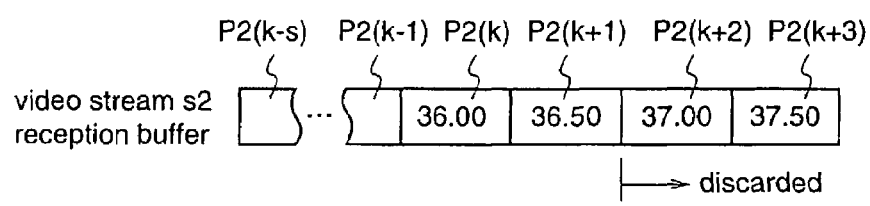
FIGS. 10(a) and 10(b) are diagrams illustrating RTP packets to be stored in reception buffers corresponding to video streams before and after the video stream switching according to the second embodiment.
Figure 10:
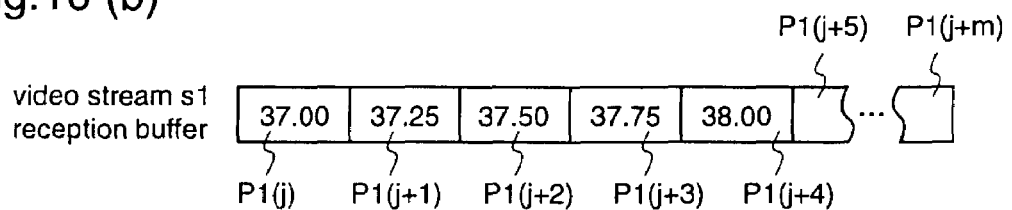

FIGS. 10(a) and 10(b) are diagrams for explaining the process of switching the video stream at the receiving terminal, taking specific RTP packets as examples.

FIG. 10(a) shows plural RTP packets P2(k−s)~P2(k+3) which have been received lately and are stored in a reception buffer corresponding to the video stream (s2.mp4), and FIG. 10(b) shows plural RTP packets P1(j)~P1(j+m) which have been received initially and are stored in a reception buffer corresponding to the video stream (s1.mp4). The display times T2(k), T2(k+1), T2(k+2), and T2(k+3) which are calculated from the time stamp values of the RTP packets P2(k), P2(k+1), P2(k+2), and P2(k+3) are 36.00(sec), 36.50(sec), 37.00(sec), and 37.50(sec), respectively, and the display times T1(j), T1(j+1), T1(j+2), T1(j+3), and T1(j+4) which are calculated from the time stamp values of the RTP packets P1(j), P1(j+1), P1(j+2), and P1(j+3), and P1(j+4) are 37.00(sec), 37.25(sec), 37.50(sec), 37.75(sec), and 38.00 (sec), respectively.

More specifically, the RTP data reception unit 216b starts reception of the video stream (s1.mp4) from the RTP packet P1(j), and ends reception of the video stream (s2.mp4) when it has received the RTP packet P2(k+3). Then, the RTP data reception unit 216b discards the RTP packets P2(k+2) and P2(k+3) corresponding to the video stream (s2.mp4), which packets have the same time stamp values (display times) as those of the packets corresponding to the video stream (s1.mp4).

Figure 11:
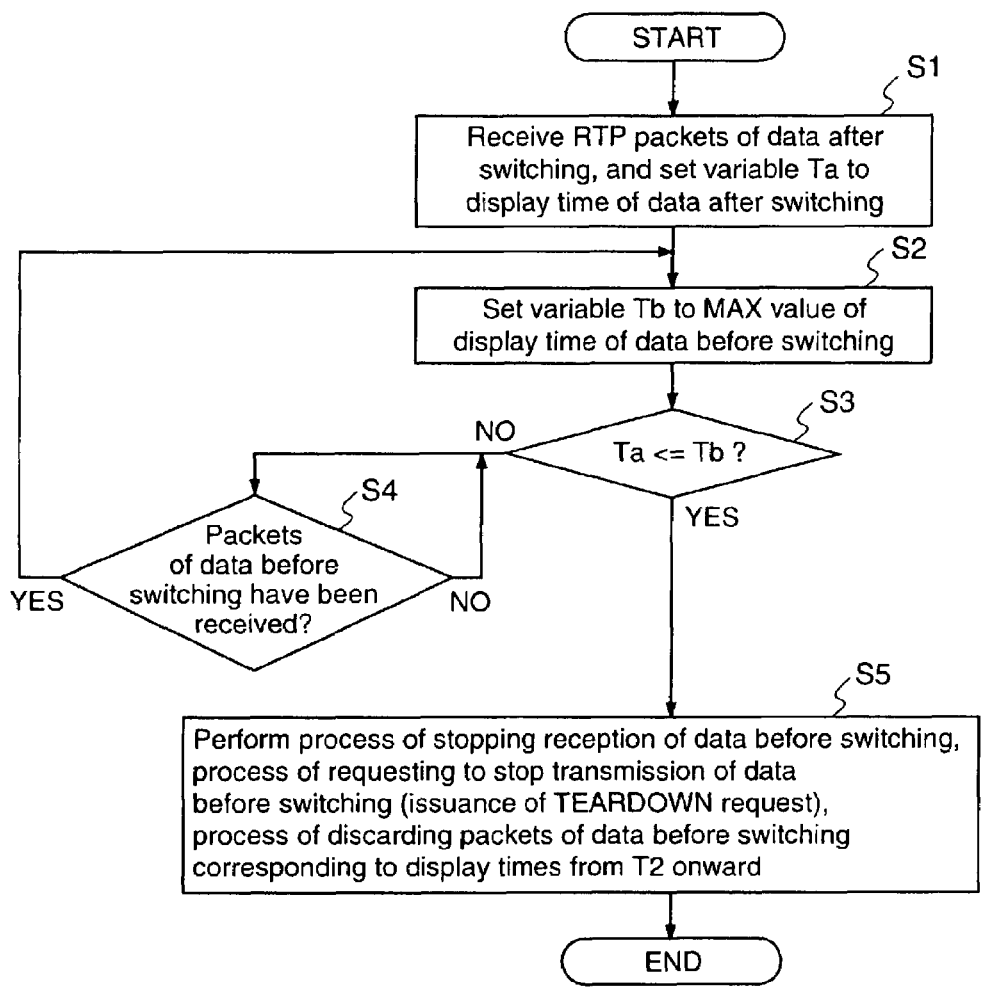
FIG. 11 is a diagram illustrating a flow of a video stream switching process in the client terminal according to the second embodiment.

FIG. 11 is a flowchart illustrating the process of switching the video stream at the receiving terminal.

When the SMIL data analysis unit 212b decides that the video stream to be received should be switched from the video stream (s2.mp4) to the video stream (s1.mp4) on the basis of the incidence of error, the process of switching the video stream shown in FIG. 11 is started.

Initially, in the RTP data reception unit 216b, reception of the RTP packet Ps1 corresponding to the video stream (s1.mp4) after the switching is carried out, and in the SMIL data analysis unit 212b, a variable Ta is set to the display time to be calculated from the time stamp value Ts1 of the firstly-received RTP packet Ps1 (display time of data after the switching) (step S1).

Next, in the SMIL data analysis unit 212b, a variable Tb is set to the display time to be calculated from the time stamp value Ts2 of the finally-received RTP packet Ps2 (the maximum value of the display time of data before the switching), which packet corresponds to the video stream (s2.mp4) before the switching (step S2).

Next, in the SMIL data analysis unit 212b, it is judged whether the variable Ta (i.e., the display time of data after the switching) is lower than the variable Tb (i.e., the maximum value of the display time of data before the switching) or not (step S3).

As a result of judgement in step S3, when the variable Ta is not smaller the variable Tb, it is judged whether the RTP packet corresponding to the video stream before the switching is received or not (step S4).

As a result of judgement in step S4, when the RTP packet corresponding to the video stream before the switching is not received, the judgement in step S4 is performed again.

On the other hand, when it is judged in step S4 that the RTP packet corresponding to the video stream before the switching is received, the variable Tb is set to the display time which is obtained from the time stamp value Ts2 of the finally-received RTP packet Ps2, in step S2.

Furthermore, when it is judged in step S3 that the variable Ta is smaller than the variable Tb, the RTP data reception unit 216b stops reception of the RTP packet Ps2 corresponding to the video stream (s2.mp4) before the switching, and discards the RTP packet Ps2 having the same time stamp value as that of the RTP packet in the video stream (s1.mp4), and furthermore, the RTSP message transmission/reception unit 214 issues a request message for stopping transmission of the RTP packet Ps2 corresponding to the video stream (s2.mp4) before the switching (step S5).

Figure 12:
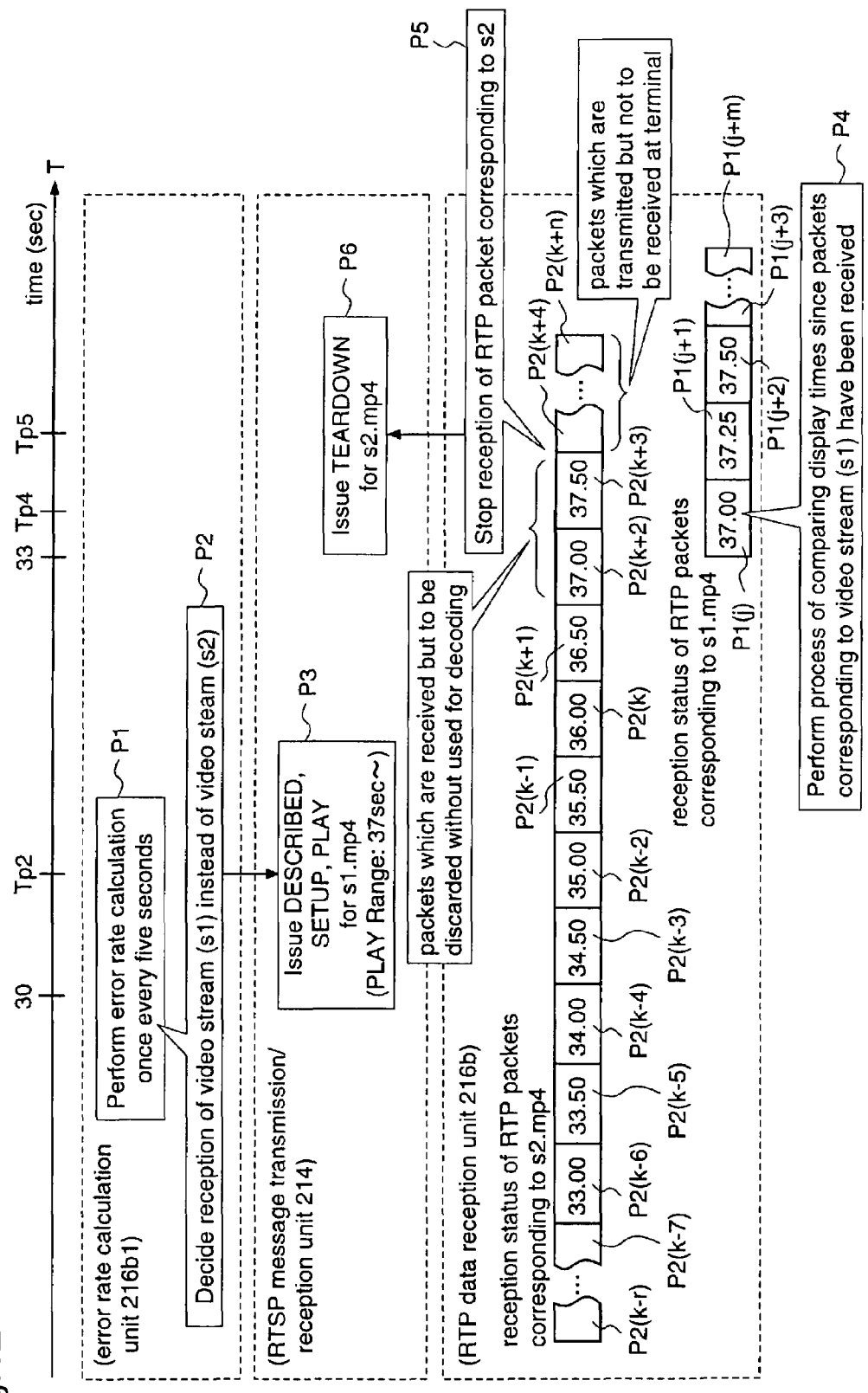
FIG. 12 is a schematic diagram illustrating specific processes to be performed in the client terminal by an RTSP message transmission/reception unit 214 and an RTP data reception unit 216b, along display timings, when the video stream switching is carried out.

FIG. 12 is a schematic diagram for describing the processes in the RTSP message transmission/reception unit 214 and the RTP data reception unit 216b of the receiving terminal when switching the video stream, according to the display timings.

In the RTP data reception unit 216b, an incidence-of-error calculation unit 216b1 performs process P1 in which the incidence of error is calculated at intervals of, for example, five seconds (i.e., once every five seconds), during reception of the RTP packets.

When the calculation unit 216b1 performs process P2 in which switching of the video stream which is currently being received (e.g., s2.mp4) to another video stream (e.g., s1.mp4) is decided according to a variation in the incidence of error (time Tp2), the RTSP message transmission/reception unit 214 performs process P3 in which a DESCRIBE request message, a SETUP request message, and a PLAY request message with respect to the video stream (s1.mp4) are issued.

Thereafter, on receipt of the RTP packet P1(j) corresponding to the video stream (s1.mp4), the RTP data reception unit 216b performs process P4 in which the display time (37.00 sec) corresponding to the time stamp value of the firstly-received RTP packet P1(j) is compared with the display time (37.00 sec) corresponding to the time stamp value of the latest RTP packet P2(k+2) which has been received at this point of time corresponding to the video stream (s2.mp4) before the switching, according to the process flow shown in FIG. 11 (time Tp4).

As a result of comparison process P4, when the RTP packet corresponding to the video stream (s2.mp4), which packet has the same time stamp value as the time stamp value of the RTP packet P1(j) that has been firstly received, is received, the RTP data reception unit 216b performs process P5 in which reception of the RTP packet corresponding to the video stream (s2.mp4) is stopped (time Tp5). Therefore, the RTP packets P2(k+4)~P2(k+n) transmitted after the reception stop process PS are not received by the receiving terminal. Further, the display times corresponding to the time stamp values of the received RTP packet P2(k+2) and P2(k+3) corresponding to the video stream (s2.mp4) before the switching are larger than the display time corresponding to the time stamp value of the firstly-received RTP packet P1(j) corresponding to the video stream (s1.mp4) after the switching, these RTP packets P2(k+2) and P2(k+3) are discarded in the RTP data reception unit 216b.

Further, the RTSP message transmission/reception unit 214 performs process P6 in which a TEARDOWN request message with respect to the video stream (s2.mp4) is issued, in parallel with the reception stop process P5 by the RTP data reception unit 216b.

In FIG. 12, P2(k−r) is a head RTP packet corresponding to the video stream (s2.mp4), and P2(k−7)~P2(k+3) are RTP packets corresponding to the video stream (s2.mp4), which have been received during a period from a few seconds before the start of the reception stop process P5 to just before the start of the reception stop process P5. These RTP packets P2(k−7), P2(k−6), P2(k−5), P2(k−4), P2(k−3), P2(k−2), P2(k−1), P2(k), and P2(k+1) are given time stamp values corresponding to display times 32.50(sec), 33.00(sec), 33.50 (sec), 34.00(sec), 34.50(sec), 35.00(sec), 35.50(sec), 36.00 (sec), and 36.50(sec), respectively.

Furthermore, P1(j+1)~P1(j+3) are RTP packets following the firstly-received RTP packet P1(j) corresponding to the video stream (s1.mp4), and these RTP packets P1(j+1)~P1(j+3) are given time stamp values corresponding to display times 37.25(sec), 37.50(sec), and 37.75(sec), respectively. Further, P1(j+m) is a finally-received RTP packet corresponding to the video stream (s1.mp4).

The time stamp value written in the header of each RTP packet is given its initial value by "timestamp" which is described in an RTP-Info field in an RTSP transmission message. Therefore, in the above-mentioned comparison process, not the time stamp values but the display times corresponding to the time stamp values are compared between the RTP packets corresponding to difference video streams.

Further, the display time Td is calculated according to the following expression (4).

$$Td=Th+(Pts-Ptsi)/Sts \qquad (4)$$

wherein Th is the time indicating the beginning position of data to be reproduced, which is specified in the Range field in the PLAY response message, Pts is the value of the time stamp given to each packet (packet time stamp), Ptsi is the initial value of the time stamp, Sts is the time scale, and this time scale is specified in the SDP information which is returned from the server as a response to the DESCRIBE request.

As described above, the data transmission system 10b according to the second embodiment is provided with the RTP data reception unit 216b which receives the RTP data Drtp from the server 100a, analyzes the received RTP packets, and outputs the error signal Rerr indicating the RTP packet loss rate (transmission error rate) in the receiving terminal to the SMIL data analysis unit 212b, instead of the RTP data reception unit 216 in the receiving terminal 200a according to the first embodiment. The data analysis unit 212b outputs the data designation signal Sc which instructs the server 100a to switch the video stream supplied from the server 100a to a video stream having a higher anti-transmission-error property or a higher video quality, according to a variation in the packet loss rate. Therefore, when the incidence of transmission error is high, the receiving terminal 200b can receive a video stream having a short I-frame interval and a high anti-error intensity from among the video streams stored at the server end. On the other hand, when the incidence of transmission error is low, the receiving terminal 200b can receive a video stream having a long I-frame interval and a high video quality, from among the video streams stored at the server end.

While in this second embodiment the SMIL file FSD2 shown in FIG. 5(a) which shows four video data files having different anti-error intensities is employed, an SMIL file FSD3 shown in FIG. 13(a) may be employed, in which three video elements having different anti-error intensities are shown, and the anti-error intensity of each video element is described as a system-protocol attribute.

The SMIL file FSD3 shown in FIG. 13(a) includes entries relating to three video elements 721~723 having different anti-error intensities, which video elements are described between a row including a switch element 732a and a row including a /switch element 732b. Further, in the entries of the respective video elements, the anti-error intensities are described as system-protocol attributes, and a video element most suitable to the contents of user setting is selected on the basis of the attributes.

In FIG. 13(a), the specific values of the system-protocol attributes in the respective video elements 721, 722, and 723 are "nop", "ret", and "fec+ret", respectively. The attribute value "nop" indicates that the video stream (s1.mp4) corresponding to the video element 721 is transmitted by RTP which is an ordinary data transmission protocol. Further, the attribute value "ret" indicates that the video stream (s2.mp4) corresponding to the video element 722 is transmitted by a transmission method in which retransmission (ret) is carried out with an anti-error property given to the ordinary data transmission protocol RTP. Further, the attribute value "fec+ret" indicates that the video stream (s3.mp4) corresponding to the video element 723 is transmitted by a transmission method in which retransmission (ret) and forward error correction (fec) are carried out with an anti-error intensity higher than that of the above-mentioned transmission method performing retransmission.

That is, retransmission and forward error correction are not performed for the video stream (s1.mp4) corresponding to the video element 721 which is given the system-protocol attribute value "nop" and, therefore, this video stream has the lowest anti-error intensity among the video streams corresponding to the three video elements described above.

Accordingly, when the anti-error intensity is set at [low level] in the receiving terminal, the video stream corresponding to the video element 721 is selected as a video stream to be received. When no anti-error intensity is set in the receiving terminal, the video stream (s1.mp4) corresponding to the video element 721 is selected as a video stream to be received first. If the incidence of transmission error increases after reception of the video stream (s1.mp4), the video stream being received is switched to the video stream (s2.mp4) or the video stream (s3.mp4) which are given the system-protocol attribute value "ret" or "ret+fec", respectively.

The video stream (s2.mp4), which corresponds to the video element 722 and is to be transmitted by the transmission method including retransmission, may be replaced with a video stream to be transmitted by a transmission method performing forward error correction, i.e., a video stream corresponding to a video element whose system-protocol attribute value is "fec".

When the SMIL file FSD3 shown in FIG. 13(a) is inputted, the SMIL data analysis unit 212b stores information described in the SMIL file in a work memory (not shown) as shown in FIG. 13(b), on the basis of the SMIL file.

To be specific, information relating to the video elements 721~723 in the SMIL file FSD3 shown in FIG. 13(a) are stored in the work memory. The number of entries to be stored in the work memory is equal to the number of elements (i.e., the number of video elements) described between the <switch> element 732a and the </switch> element 732b in the SMIL file FSD3.

As shown in FIG. 13(b), each entry includes a URL (server address) indicating the address of the corresponding video stream on the network; a transmission protocol of the corresponding video stream; an execution flag indicating whether the corresponding video stream is in the received (reproduced) state where the stream is received and reproduced or in the unreceived (unreproduced) state where the stream is not received nor reproduced; and a latest time stamp relating to the corresponding video stream.

In an entry E1 having an entry number [1], the value of the execution flag is "1", which means that the video stream corresponding to this entry E1 is currently being received (reproduced). Further, in entries E2 and E3 having entry numbers [2] and [3], the values of the execution flags are "0", which means that the video streams corresponding to these entries E2 and E3 are not received (reproduced) currently.

Further, the specific values indicating the protocol types in the respective entries E1~E3 are "nop", "ret", and "fec+ret", respectively, and these values are equal to the values of the system-protocol attributes in the SMIL file FSD3.

Moreover, the latest time stamps in the entries E1~E3 are updated at any time according to the time stamps given to the headers of the most-recently received RTP packets, and these time stamps are used for determining a data request timing when a video stream corresponding to a specific entry is switched to a video stream corresponding to another entry.

In FIG. 13(b), the values of the latest time stamps in the entries E2 and E3 are "0", which means that the video streams corresponding to these entries are not received yet. Further, the value of the latest time stamp in the entry E1 is "3060000". Since time stamps are set using a clock of 90 kHz in MPEG-4, this value "3060000" is equivalent to 34 sec.

FIG. 13(c) shows the relationship between the incidence of error and the protocol.

Information relating to this relationship is stored in an information storage section (not shown) in the SMIL data analysis unit 212b, as table information Rtp that is unique to the receiving terminal. In the table information Rtp, the incidence of error (threshold value) Eth (Eth=0(%)) corresponds to a video stream to be transmitted by the ret protocol, Eth (0<Eth≦3(%)) corresponds to a video stream to be transmitted by the ret protocol, and Eth (3<Eth(%)) corresponds to a video stream to be transmitted by the fec+ret protocol. That is, in the table information Rtp, the incidence of error, 0%, 3%, or 6%, is the threshold value when switching the video stream according to the incidence of error.

In the SMIL data analysis unit 212b, switching of the video stream according to variations in the incidence of error is carried out on the basis of the relationship between the incidence of error and the protocol. Further, switching of the video stream for seamless reproduction is carried out in the same way as the processing described with respect to FIGS. 9 to 12.

While in this second embodiment the user sets the anti-error intensity of the video data to be received first among the plural video data corresponding to the same video sequence and having different anti-error intensities, the anti-error intensity of the video data to be received first may be a default value that is unique to the receiving terminal.

In this case, the receiving terminal requests a video stream corresponding to a video element suited to the default value of the anti-error intensity, among the plural video elements 711~714 described in the SMIL file FSD2, and receives this video stream. Thereafter, in the receiving terminal, the video stream being received is switched to a video stream having an appropriate anti-error intensity according to the incidence of error during reception of the video stream.

Furthermore, while in this second embodiment switching of the video stream is carried out according to the incidence of error in the video stream being received, switching of the video stream may be carried out according to the intensity of the radio wave being received.

Embodiment 3

Figure 14:
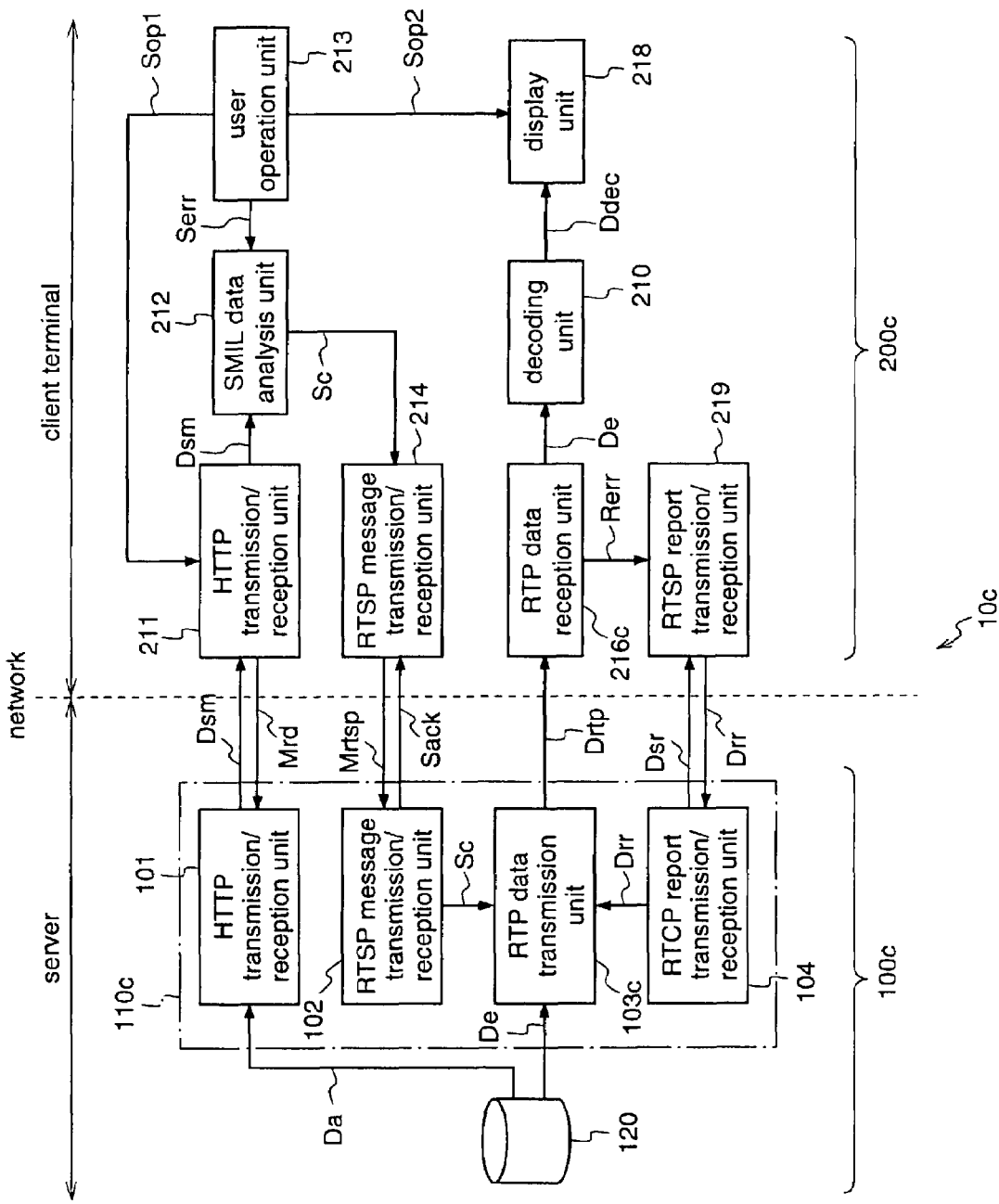
FIG. 14 is a block diagram for explaining a data transmission system according to a third embodiment of the present invention, illustrating specific constructions of a server and a client terminal which are components of the system.

FIG. 14 is a block diagram for explaining a data transmission system 10(c) according to a third embodiment of the present invention, illustrating the constructions of a server and a client terminal in the system 10(c).

In FIG. 14, the same reference numerals as those shown in FIG. 3 denote the same parts.

The data transmission system 10c is provided with a client terminal (receiving terminal) 200c and a server 100c instead of the client terminal 200a and the server 100a in the data transmission system 10a according to the first embodiment. The client terminal 200c provides the server 100c with information Drr relating to the transmission status, such as the incidence of transmission error in RTP data (RTP packets) supplied from the server, the packet arrival time, and the like, and the server 100c switches a video stream (RTP data) being transmitted from the server 100c to another video stream having a different coding condition, on the basis of the transmission status information Drr from the client terminal 200c.

The client terminal 200c is provided with an RTP data reception unit 216c instead of the RTP data reception unit 216a of the client terminal 200a. The RTP data reception unit 216c receives RTP data Drtp, and detects the transmission status such as the incidence of transmission error in the RTP data, the RTP packet arrival time, and the like. Further, the client terminal 200c is provided with an RTCP report transmission/reception unit 219 which transmits information Drr indicating the transmission status as a receiver report to the server 100c.

On the other hand, the server 100c is provided with an RTCP report transmission/reception unit 104 which provides the RTCP report transmission/reception unit 219 of the receiving terminal 200c with information Dsr relating to the number of RTP packets transmitted from the server, the sequence numbers, and the like, as a sender report, and receives the receiver report from the transmission/reception unit 219. Further, the server 100c is provided with an RTP data transmission unit 103c instead of the RTP data transmission unit 103 of the server 100a according to the first embodiment. The RTP data transmission unit 103c receives the information Drr as the receiver report, and switching a video stream (RTP data) being transmitted to another video stream having a different coding condition, on the basis of the transmission status such as the incidence of transmission error, the RTP packet arrival time, and the like.

The RTCP report transmission/reception units 104 and 219 transmit the sender report and the receiver report by RTCP (Real Time Control Protocol). Further, the receiver report is notified to the server 100c periodically, e.g., at intervals of 5 sec. The timing of switching the video stream in the server 100c is desired to be the timing of appearance of an I frame.

Next, the operation of the data transmission system 10c will be described.

The operation of the data transmission system 10c is different from the operation of the data transmission system 10a of the first embodiment only in that the server 100c switches the video stream being transmitted as RTP data to the receiving terminal 200a, to another video stream having a different coding condition, on the basis of the receiver report supplied from the receiving terminal 200c.

More specifically, in the RTP data reception unit 216c of the receiving terminal 200c, the incidence of transmission error in the received RTP data Drtp is detected, and an error signal Rerr indicating this incidence of error is outputted to the RTCP report transmission/reception unit 219.

Then, information relating to the incidence of transmission error, the RTP packet arrival time, and the like is transmitted as a receiver report Drr from the RTCP report transmission/reception unit 219 to the server 100c.

Then, in the RTCP report transmission/reception unit 104 of the server 100c, the incidence of transmission error in the RTP data Drtp and the delay time of packet arrival are detected, on the basis of the information received as the receiver report Drr, and the information Drr indicating the incidence of error and the arrival delay is outputted to the RTP data transmission unit 103c.

In the RTP data transmission unit 103c, a video file having a predetermined anti-error property is selected from among the plural video files stored in the data storage unit 120, according to an increase or reduction in the incidence of error or the packet arrival delay time, and the selected video file is transmitted as RTP data Drtp to the receiving terminal 200c.

As described above, the data transmission system 10c of the third embodiment is provided with, instead of the client terminal 200a of the system 10a according to the first embodiment, the client terminal 200c which provides the server 100c with the information Drr relating to the transmission status, such as the incidence of transmission error in the RTP data (RTP packets) supplied from the server, the packet arrival time, and the like. Further, the system 10c is provided with, instead of the server 100a of the system 10a according to the first embodiment, the server 100c which switches the video stream (RTP data) being transmitted from the server 100c to another video stream having a different coding condition, on the basis of the transmission status information Drr from the client terminal 200c. Therefore, the server 100c can transmit a video stream having a short I-frame interval and a high anti-error intensity among the plural video streams when the incidence of transmission error is high, and transmit a video stream having a long I-frame interval and a high video quality among the plural video stream when the incidence of the transmission error is low.

Embodiment 4

Figure 15:
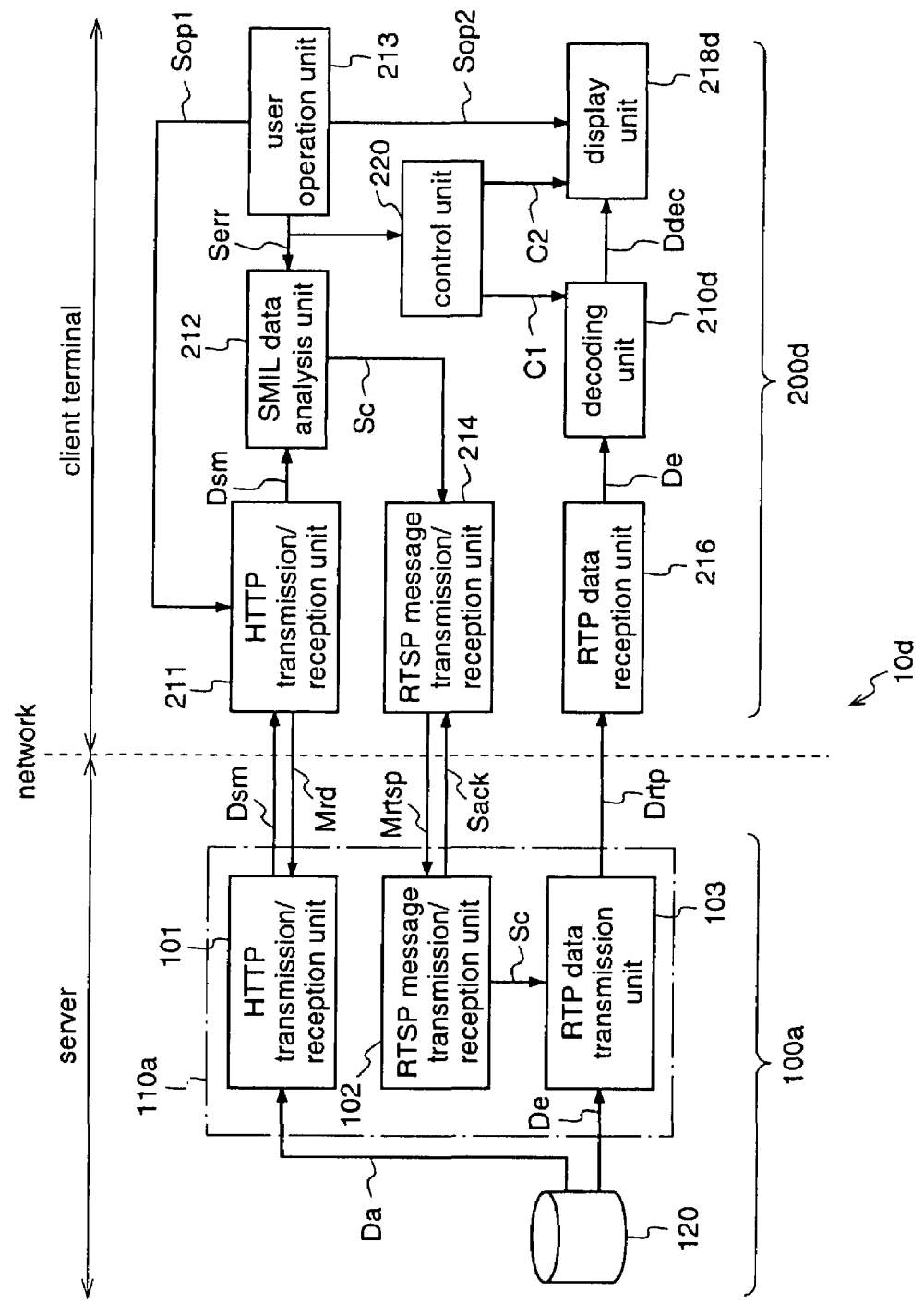
FIG. 15 is a block diagram for explaining a data transmission system according to a fourth embodiment of the present invention, illustrating specific constructions of a server and a client terminal which are components of the system.

FIG. 15 is a block diagram for explaining a data transmission system 10d according to a fourth embodiment of the present invention, illustrating the constructions of a server and a client terminal in the system 10d.

In FIG. 15, the same reference numerals as those shown in FIG. 3 denote the same parts.

The data transmission system 10d according to this fourth embodiment is provided with, instead of the client terminal 200a of the system 10a according to the first embodiment, a client terminal 200d which changes the decoding process and display process according to the operation contents set by the user.

To be specific, the client terminal 200d is provided with, instead of the decoding unit 210 and the display unit 218 in the client terminal 200a of the first embodiment, a decoding unit 210d which changes the operation mode for performing decoding of a video stream, on the basis of a control signal C1, and a display unit 218d which changes the operation mode for performing display of video data Ddec, on the basis of a control signal C2.

Next, the operation of the data transmission system 10d will be described.

The operation of the data transmission system 10d of this fourth embodiment is different from the operation of the system 10a of the first embodiment only in that the video stream decoding process mode and the video data display process mode are changed in the receiving terminal 200d according to the contents of user setting.

To be specific, in the case where a video stream having an I-frame interval shorter than a predetermined reference interval that is unique to the receiving terminal is set as a video stream to be reproduced in the receiving terminal 200d by user operation with the user operation unit 213, the operation mode of the decoding unit 210d is set to a first decoding operation mode in which, when a transmission error occurs, decoding is temporarily stopped until a video stream corresponding to an I frame is normally received, according to a control signal C1 supplied from the control unit 220. Further, in this case, the operation mode of the display unit 218d is set to a first display operation mode in which, when a transmission error occurs, video data which has been decoded just before the occurrence of the transmission error is displayed until a video stream corresponding to an I frame is normally received, according to a control signal C2 from the controller 220.

On the other hand, in the case where a video stream having an I-frame interval equal to or larger than the predetermined reference interval unique to the receiving terminal is set as a video stream to be reproduced in the receiving terminal 200d by user operation with the user operation unit 213, the operation mode of the decoding unit 210d is set to a second decoding operation mode in which, when a transmission error occurs, decoding of a frame whose data is lost due to the transmission error is skipped and decoding is resumed from a frame whose data is normally received after the occurrence of the transmission error, according to a control signal C1 supplied from the control unit 220. In this second decoding operation mode, when the frame whose data is normally received after the occurrence of the transmission error is a P frame, decoding is carried out with reference to a frame which has been decoded just before the occurrence of the transmission error. In this case, the operation mode of the display unit 218d is set to a second display operation mode in which all of frames whose data have been decoded are displayed regardless of the occurrence of the transmission error.

As described above, in the data transmission system 10*d* according to the fourth embodiment, the operation modes of the decoding unit 210*d* and the display unit 218*d* in the receiving terminal are changed according to the condition relating to the anti-error property of the video stream requested by the receiving terminal, which condition is set on the receiving terminal by the user. That is, in the case where the condition that the video stream to be received by the receiving terminal should be a video stream having an I-frame interval shorter than a predetermined reference value is set, when a transmission occurs, decoding is temporarily stopped until a video stream corresponding to an I frame is normally received, and the video data which has been decoded just before the occurrence of the transmission error is displayed. On the other hand, in the case where the condition that the video stream to be received by the receiving terminal should be a video stream having an I-frame interval equal to or larger than the predetermined reference value is set, decoding is performed on only frames other than a frame whose data is lost due to the transmission error, and all of the frames whose data have been decoded are displayed. Therefore, the decoding unit and the display unit can be set to the operation modes having less incongruity of a display image at the occurrence of an error, according to the anti-error intensity (i.e., I-frame interval) of the video stream to be received, which is set by the user.

In this fourth embodiment, the data transmission system changes the decoding process mode and the display process mode in the receiving terminal according to the conditions relating to the video stream, which are set on the receiving terminal by the user. However, the data transmission system may change the operation modes of the decoding unit 210*d* and the display unit 218*d* on the basis of the I frame appearance interval (I frame cycle) relating to the video stream supplied from the server, which interval is informed from the server. In this case, the information indicating the I-frame appearance interval can be transmitted from the server to the receiving terminal by using SMIL, SDP, RTSP, or the like.

Furthermore, this fourth embodiment employs, as the second decoding operation mode of the decoding unit 210*d*, an operation mode in which, when a transmission error occurs, only decoding of a frame whose data is lost due to the transmission error is skipped, and decoding is resumed from a frame whose data has been normally received after the occurrence of the transmission error. However, the second decoding operation mode is not restricted to this.

For example, when a video stream corresponding to an I frame is stored over plural video packets as shown in FIG. 6(*b*), the second decoding operation mode (i.e., the decoding operation mode to be employed when the set I-frame interval is equal to or larger than the predetermined reference interval unique to the receiving terminal) may be an operation mode in which decoding is performed on only data of packets other than a video packet whose data is lost due to the transmission error.

In this case, the video data display mode may be identical to the second display operation mode of this fourth embodiment wherein all of frames, for which decoding has been performed on at least portions of data, are displayed.

Moreover, while in this fourth embodiment the control unit changes the operation mode of the decoding unit from the first decoding operation mode to the second decoding operation mode according to the user setting in the receiving terminal, the control unit may control the operation of the decoding unit according to conditions other than those set in the receiving terminal by the user.

For example, at a point of time where a transmission error occurs, a time until a video stream corresponding to an I frame is decoded next can be calculated because the I-frame interval is known. Therefore, when a transmission error occurs, the control unit decides that the decoding operation of the decoding unit should be either a decoding operation in which decoding is stopped during a period from the decoding time of the frame in which the transmission error occurs to the decoding time of an I frame after the transmission error, or a decoding operation in which inter-frame coded data is decoded, excluding portions which cannot be decoded due to the transmission error, during a period from the decoding time of the frame in which the transmission error occurs to the decoding time of an I frame after the transmission error, according to a difference between the decoding time of the frame in which the transmission error occurs and the decoding time of an I frame to be decoded after the transmission error, and thereafter, the control unit controls the decoding unit so as to perform the decided decoding operation after the occurrence of the transmission error.

To be specific, when a transmission error occurs, if the time difference from the decoding time of the frame in which the transmission error occurs to the decoding time of an I frame to be decoded after the transmission error is smaller than the predetermined value unique to the receiving terminal, the control unit controls the decoding unit so as to perform the decoding operation in which decoding of the video data is stopped during a period from the decoding time of the frame in which the transmission error occurs to the decoding time of an I frame after the transmission error. On the other hand, if the time difference from the decoding time of the frame in which the transmission error occurs to the decoding time of an I frame to be decoded after the transmission error is equal to or larger than the predetermined value, the control unit controls the decoding unit so as to perform the decoding operation in which only the video data corresponding to the frames other than the frame in which the transmission error occurs are decoded during a period from the decoding time of the frame in which the transmission error occurs to the decoding time of an I frame after the transmission error.

When the video data corresponding to each frame is packetized into units of data that is smaller than the frame as shown in FIG. 6(*b*), the above-described decoding operation of decoding only the frames other than the frame where the transmission error occurs may be a decoding operation of decoding only packets other than the packet where the transmission error occurs in the received video data.

Further, in the first to fourth embodiments described above, the user's preference relating to the display image (e.g., whether the user prefers video data having a short I-frame interval or video data having a long I-frame interval) may be informed to the server using RTSP. Further, the protocol for informing the user's preference may be another transmission protocol, CC/PP (Composite Capability/Preference Profiles). At this time, the server may inform candidates of video streams to the receiving terminal using SMIL.

Moreover, while in the first to fourth embodiments the data to be transmitted from the server to the receiving terminal is video data, the data may be audio data or text data. That is, even when audio data or text data is transmitted by RTP/UDP/IP, the same effects as described above are achieved.

For example, audio or text data suited to the anti-error intensity of data to be received, which is set by the user in the receiving terminal or set as a default value of the receiving terminal, is selected from among plural pieces of audio data or text data which correspond to the same contents and have different anti-error intensities, and the selected audio or text data is reproduced in the receiving terminal. As an example of a case where plural audio data (text data) have different anti-error properties, there is a case where either of the audio data (text data) uses frames to be decoded with reference to data of audio frames (text frames) which have previously been decoded while the other audio data (test data) does not use such frames.

Furthermore, the plural audio data or text data which correspond to the same contents and have different anti-error intensities may be those having different data transmission protocols. As an example of audio data (text data) having different transmission protocols, there are audio data (text data) having different redundancies of FEC (Forward Error Correction, RFC 2733) which is defined in IETF (Internet Engineering Task Force).

Embodiment 5

Figure 21:
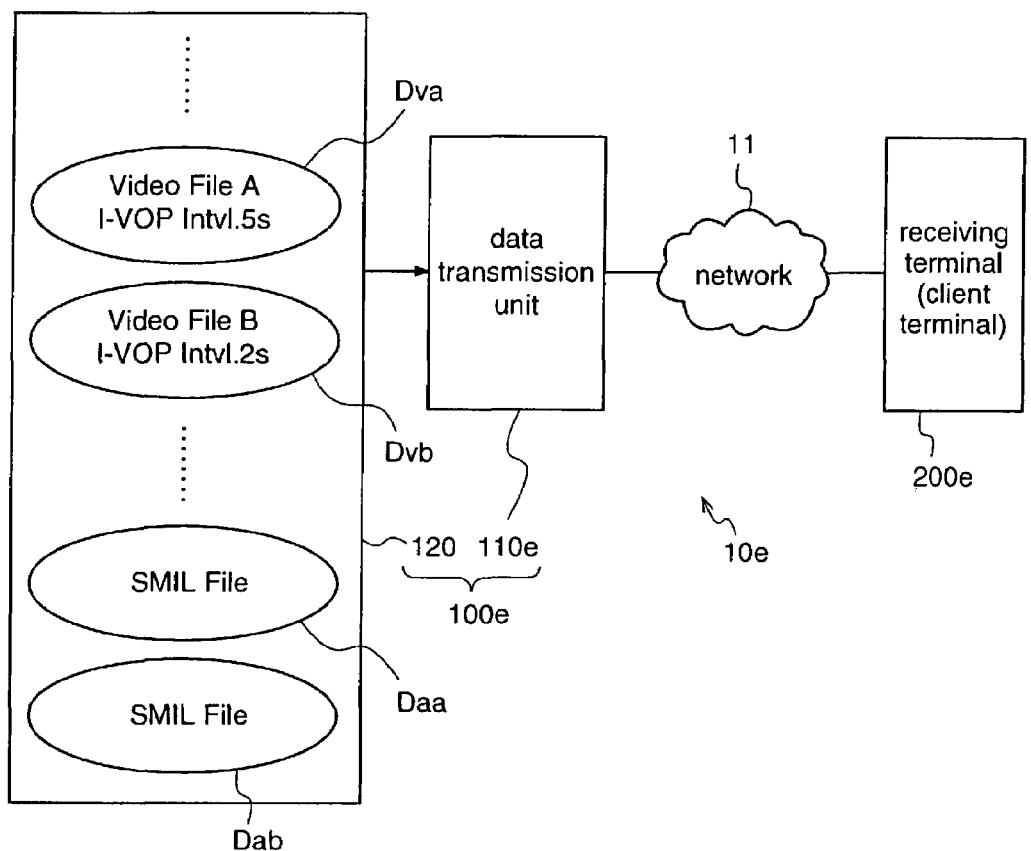
FIGS. 21(a) and 21(b) are diagrams for explaining a data transmission system according to a fifth embodiment of the present invention.
Figure 21:
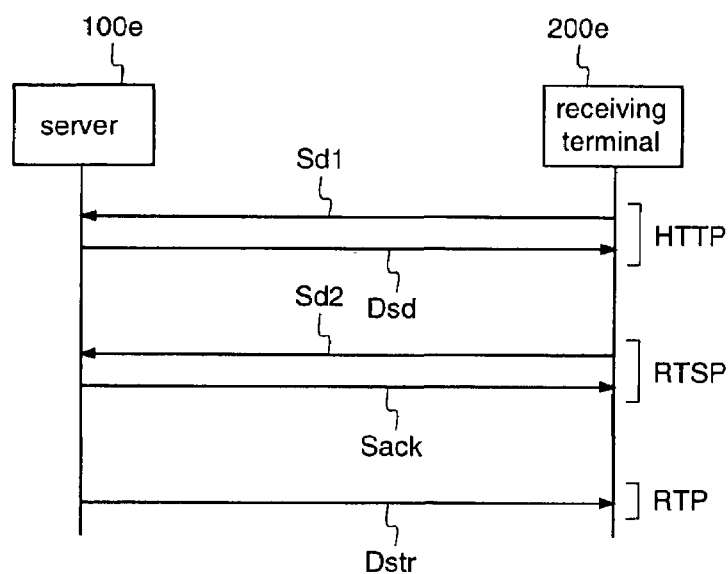

FIGS. 21(a) and 21(b) are diagrams for explaining a data transmission system 10e according to a fifth embodiment of the present invention, and FIG. 21(a) illustrates the construction of the system while FIG. 1(b) illustrates a data transmission process in the system.

The data transmission system 10e according to the fifth embodiment comprises a server 100e for outputting a predetermined video stream (coded video data); a receiving terminal (client terminal) 200e for receiving the video stream outputted from the server 100a, and reproducing video data; and a network 11 for transferring the video stream from the server 100e to the receiving terminal 200e.

The server 100e comprises a data storage unit 120e for holding plural video streams which are obtained by coding digital video signals corresponding to plural video sequences under predetermined coding conditions, and holding SMIL data in which the attributes of the respective video streams are described; and a data transmission unit 110e for transmitting the data stored in the data storage unit 120e onto the network 11. Further, the data storage unit 120e is implemented by a bulk storage such as a hard disk.

In this fifth embodiment, the plural video streams are video data corresponding to different video sequences and having predetermined anti-error properties, respectively. More specifically, each of the plural video streams includes intra-frame coded data having a relatively large amount of codes, which is obtained by coding a digital video signal using intra-frame pixel value correlation, and inter-frame coded data having a relatively small amount of codes, which is obtained by coding a digital video signal using inter-frame pixel value correlation, and each video stream has a predetermined appearance interval of intra-frame coded data, in other words, a predetermined I-frame (I-VOP) interval.

In the data storage unit 120e such as a hard disk, for example, video streams having I-frame intervals of 5 sec and 2 sec are stored as video files Dva and Dvb, respectively, and SMIL files in which the attributes of the corresponding video files Dva and Dvb are described are stored as SMIL data Daa and Dab. The I-frame (I-VOP) appearance intervals as the attributes of the respective video streams (video files) Dva and Dvb are 5 sec and 2 sec, respectively.

Figure 22:
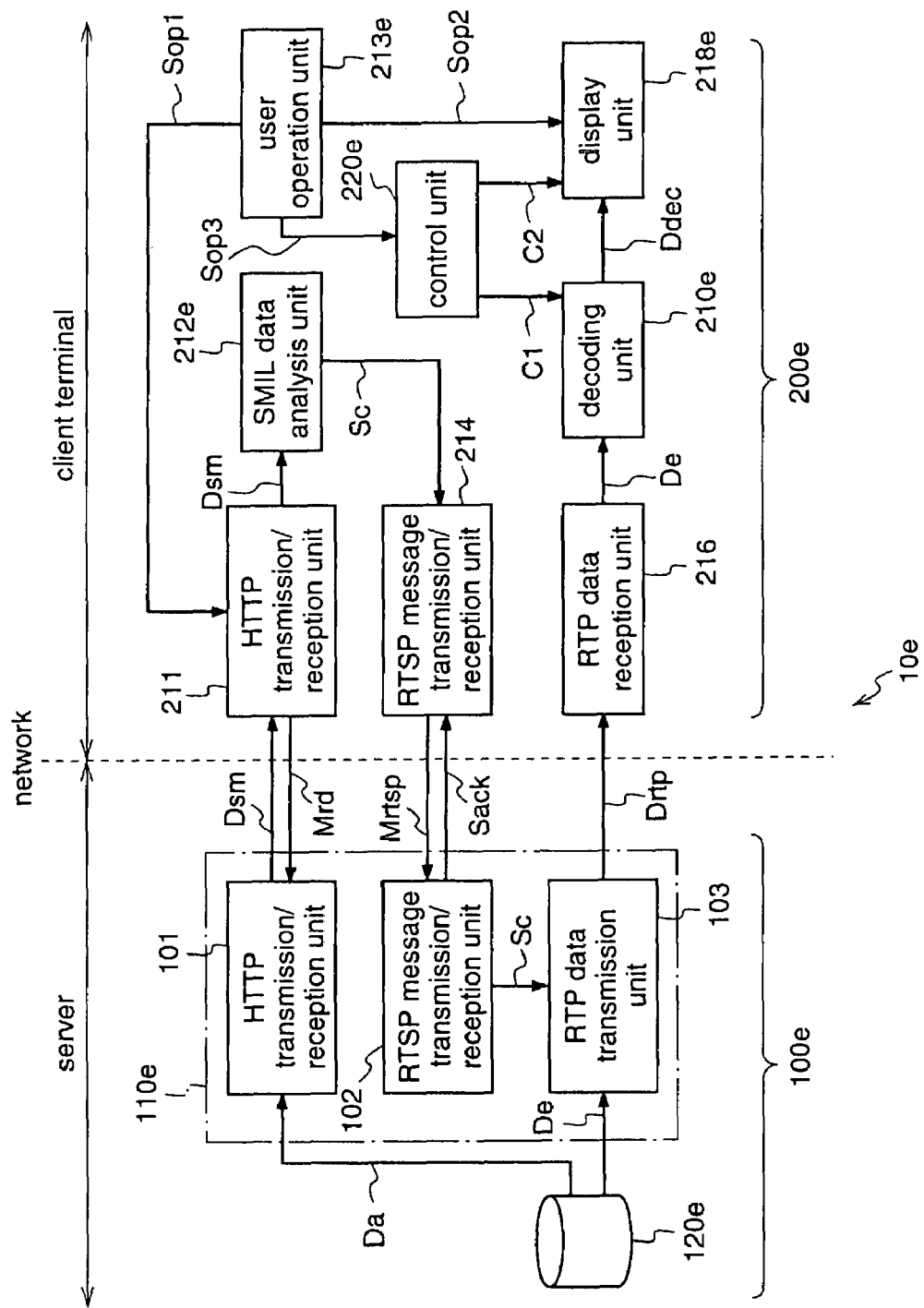
FIG. 22 is a block diagram illustrating the specific constructions of a server and a client terminal which are constituents of the data transmission system according to the fifth embodiment.

FIG. 22 is a block diagram illustrating the specific constructions of the server 100e and the client terminal 200e which are constituents of the data transmission system 10e.

A data transmission unit 110e constituting the server 100e comprises an HTTP transmission/reception unit 101 for receiving an SMIL data request message Mdr which is transmitted by HTTP from the client terminal 200e, reading an SMIL file Da from the data storage unit 120e according to the request, and transmitting the read SMIL file Da as SMIL data Dsm by HTTP; an RTSP message transmission/reception unit 102 for receiving a data request message Mrtsp transmitted by RTSP from the client terminal 200e, and outputting a data designation signal Sc indicating a requested video file title; and an RTP data transmission unit 103 for receiving the data designation signal Sc, reading a video stream De corresponding to the video file title indicated by the data designation signal Sc from the data storage unit 120e, and transmitting the read video stream as RTP data Drtp by RTP. The HTTP transmission/reception unit 101, the RTSP message transmission/reception unit 102, and the RTP data transmission unit 103, which are constituents of the data transmission unit 110e of this fifth embodiment, are identical to those of the data transmission unit 110a of the first embodiment.

On the other hand, the client terminal 200e includes a user operation unit 213 for outputting various kinds of user operation signals Sop1, Sop2, and Sop3 according to user operation; an HTTP transmission/reception unit 211 for transmitting, by HTTP, the SMIL data request message Mdr corresponding to video data specified by the user, on the basis of the user operation signal Sop1, and receiving the SMIL data Dsm transmitted by HTTP from the server 100e; and an SMIL data analysis unit 212e for analyzing the SMIL data Dsm, and outputting a data designation signal Sc which designates the video data specified by the user, on the basis of the analysis result.

The client terminal 200e further includes an RTSP message transmission/reception unit 214 for transmitting the data designation signal Sc as an RTSP message signal Mrtsp, and receiving an acknowledgement signal Sack of the signal Mrtsp; and an RTP data reception unit 216 for receiving the RTP data Drtp transmitted from the server 100e, and outputting a video stream De.

Furthermore, the client terminal 200e includes a decoding unit 210e for decoding the video stream De to output video data Ddec, and changing the operation mode of decoding the video stream on the basis of a control signal C1; a display unit 218e for performing image display on the basis of the video data Ddec, and changing the operation mode of displaying the video data Ddec on the basis of a control signal C2; and a control unit 220e for controlling the operation modes of the decoding unit 210e and the display unit 218e with the control signals C1 and C2. The display unit 218e performs display according to the user operation signal Sop2.

Further, in the client terminal 200e, a predetermined value to be compared with the appearance interval of intra-frame coded data in the video data being received is set as a default value. When an error occurs, the operation mode of the decoding unit is changed according to the result of comparison between the predetermined value and the appearance interval of intra-frame coded data in the video data being received. To be specific, when video data whose intra-frame coded data appearance interval is shorter than the predetermined value is received, the decoding unit is set in a first decoding operation mode in which, when a transmission error occurs, decoding is temporarily stopped until intraframe coded data is normally received after the occurrence of the transmission error. On the other hand, when video data whose intra-frame coded data appearance interval is equal to or longer than the predetermined value is received, the decoding unit is set in a second decoding operation mode in which, when a transmission error occurs, decoding is carried out excluding a portion which becomes undecodable due to the transmission error.

While the receiving terminal 200e possesses, as a default value, a predetermined value to be compared with the intra-frame coded data appearance interval in the video data being received, the predetermined value may be set in the receiving terminal 200e by user operation.

Hereinafter, the operation of the data transmission system 10e will be described.

In the data transmission system 10e, when the user performs an operation of making a request for a predetermined video file with the user operation unit 213e, an SMIL request signal Sd1 (SMIL request message Mdr shown in FIG. 22) requesting SMIL data corresponding to the video file specified by the user is transmitted by HTTP from the HTTP transmission/reception unit 211 of the receiving terminal 200e to the server 100e as shown in FIG. 21(b), and SMIL data Dsm is transmitted from the HTTP transmission/reception unit 101 of the server 100e to the receiving terminal 200e as an HTTP signal Dsd in response to the request. The user operation of specifying a video file of a desired video sequence using the user operation unit 213e is carried out in the same manner as the operation which has been described using the mobile terminal shown in FIG. 4(a).

Thereafter, in the receiving terminal 200e, the RTSP message transmission/reception unit 214 transmits a message Mrtsp designating the video stream desired by the user, as an RTSP signal Sd2, to the server 100e, on the basis of the data designation signal Sc corresponding to the result of analysis of the SMIL data Dsm. Then, an acknowledgment signal Sack is transmitted by RTSP from the RTSP message transmission/reception unit 102 of the server 100e to the receiving terminal 200e and, thereafter, a predetermined video stream Dstr is transmitted as RTP data Drtp from the RTP data transmission unit 103 of the server 100e to the receiving terminal 200e.

When the RTP data Drtp is transmitted through the network 11 to the receiving terminal 200e, the RTP data Drtp is received by the RTP data reception unit 216 in the receiving terminal 200a, and the video stream De is outputted to the decoding unit 210e. In the decoding unit 210e, the video stream De is decoded to generate video data Ddec, and the video data Ddec is outputted to the display unit 218e. In the display unit 218e, image display is carried out on the basis of the video data Ddec.

In the data transmission system 10e of this fifth embodiment, when an error occurs during transmission of the video stream, the operation mode of the decoding unit 210e and the operation mode of the display unit 218e are changed on the basis of the control signals C1 and C2 from the control unit 220e, according to the result of comparison between the intra-frame coded data appearance interval (i.e., I-frame cycle) that is set as a default value in the receiving terminal 200e, and the I-frame interval as the attribute value of the video stream being received.

To be specific, when the receiving terminal 200a is receiving a video stream whose I-frame interval (I-VOP interval) is shorter than the predetermined value at the receiving terminal (constant reference interval), the decoding unit 210e is set in the first decoding operation mode in which, when a transmission error occurs, decoding is temporarily stopped until a video stream corresponding to I frames is normally received, according to the control signal C1 from the control unit 220e. In this case, the display unit 218e is set in the first display operation mode in which, when a transmission error occurs, video data which has been decoded just before the occurrence of the transmission error is displayed until a video stream corresponding to a next I frame is normally received, according to a control signal C2 from the controller 220e.

On the other hand, when the receiving terminal 200e is receiving a video stream whose I-frame interval is equal to or longer than the predetermined value at the receiving terminal (constant reference interval), the decoding unit 210 is set in the second decoding operation mode in which, when a transmission error occurs, decoding of a frame whose data is lost due to the transmission error is skipped and decoding is resumed from a frame whose data is normally received after the occurrence of the transmission error, according to the control signal C1 from the control unit 220e. In this second decoding operation mode, when the frame whose data is normally received after the occurrence of the transmission error is a P frame, decoding is carried out with reference to a frame which has been decoded just before the occurrence of the transmission error. In this case, the display unit 218e is set in the second display operation mode in which all of frames whose data have been decoded are displayed regardless of the occurrence of the transmission error.

As described above, in the data transmission system 10e according to the fifth embodiment, the operation modes of the decoding unit 210e and the display unit 218e in the receiving terminal are changed according to the predetermined value of the I-frame interval which is set in the receiving terminal as a default value, and the value of the I-frame interval of the video stream being received. That is, in the case where the value of the I-frame interval of the video stream being received by the receiving terminal is shorter than the predetermined value that is set in the receiving terminal as a default value, when a transmission error occurs, decoding is temporarily stopped until a video stream corresponding to an I frame is normally received, and the video data which has been decoded just before the occurrence of the transmission error is displayed. On the other hand, in the case where the value of the I-frame interval of the video stream being received by the receiving terminal is equal to or longer than the predetermined value that is set in the receiving terminal as a default value, decoding is performed on only frames other than a frame whose data is lost due to the transmission error, and all of the frames whose data have been decoded are displayed. Therefore, the decoding unit and the display unit can be set in the operation modes having less incongruity of a display image at the occurrence of an error, according to the anti-error intensity (i.e., I-frame interval) of the video stream to be received.

While in this fifth embodiment the I-frame appearance interval (I-frame cycle) as the attribute value of the video stream to be received is supplied as the SMIL file from the server 100e to the receiving terminal 200e, the I-frame appearance interval may be transmitted using SDP or RTSP from the server to the receiving terminal.

Further, while in this fifth embodiment the I-frame appearance interval (I-frame cycle) of the video stream to be received is transmitted from the server to the receiving terminal, the I-frame appearance interval may be calculated from information included in the received video stream by the RTP data reception unit 216 of the receiving terminal 200e.

Furthermore, this fifth embodiment employs, as the second decoding operation mode of the decoding unit 210e, an operation mode in which, when a transmission error occurs, only decoding of a frame whose data is lost due to the transmission error is skipped, and decoding is resumed from a frame whose data has been normally received after the occurrence of the transmission error. However, the second decoding operation mode is not restricted to this.

For example, when a video stream corresponding to an I frame is stored over plural video packets as shown in FIG. 6(b), the second decoding operation mode may be an operation mode wherein decoding is performed on only data of packets other than a video packet whose data is lost due to the transmission error.

In this case, the video data display mode may be identical to the second display operation mode of this fifth embodiment wherein all of frames, for which decoding has been performed on at least portions of data, are displayed.

Moreover, while in this fifth embodiment the operation mode of the decoding unit at the occurrence of a transmission error is switched according to the result of comparison between the I-frame appearance interval in the video stream being received and the default value (predetermined value) set in the receiving terminal, the switching of the operation mode of the decoding unit is not restricted to this.

For example, at a point of time when a transmission error occurs, a time until a video stream corresponding to an I frame is decoded next can be calculated because the I-frame interval is known. Therefore, when a transmission error occurs, the control unit decides that the decoding operation of the decoding unit should be either a decoding operation in which decoding is stopped during a period from the decoding time of the frame in which the transmission error occurs to the decoding time of an I frame after the transmission error, or a decoding operation in which inter-frame coded data is decoded, excluding portions which cannot be decoded due to the transmission error, during a period from the decoding time of the frame in which the transmission error occurs and the decoding time of an I frame to be decoded after the transmission error, and thereafter, the control unit controls the decoding unit so as to perform the decided decoding operation after the occurrence of the transmission error.

To be specific, when a transmission error occurs, if the time difference from the decoding time of the frame in which the transmission error occurs to the decoding time of an I frame to be decoded after the transmission error is smaller than the default value (predetermined value) set in the receiving terminal, the control unit controls the decoding unit so as to perform the decoding operation in which decoding of the video data is stopped during a period from the decoding time of the frame in which the transmission error occurs to the decoding time of an I frame after the transmission error. On the other hand, if the time difference from the decoding time of the frame in which the transmission error occurs to the decoding time of an I frame to be decoded after the transmission error is equal to or larger than the default value (predetermined value) set in the receiving terminal, the control unit controls the decoding unit so as to perform the decoding operation in which only the video data corresponding to the frames other than the frame in which the transmission error occurs are decoded during a period from the decoding time of the frame in which the transmission error occurs to the decoding time of an I frame after the transmission error.

The decoding operation of decoding the inter-frame coded data excluding the portion which becomes undecodable due to the transmission error is identical to the decoding operation of decoding only frames other than the frame in which the transmission error occurs.

When the video data corresponding to each frame is packetized into units of data that is smaller than the frame as shown in FIG. 6(b), the above-described decoding operation of decoding only the frames other than the frame where the transmission error occurs may be a decoding operation of decoding only packets other than the packet where the transmission error occurs in the received video data.

Furthermore, while in the fifth embodiment the data to be transmitted from the server to the receiving terminal is video data, the data may be audio data or text data. That is, even when audio data or text data is transmitted by RTP/UDP/IP, the same effects as described above are achieved.

Moreover, as a data reproduction apparatus which makes a request for video data to be received from the server on the basis of user setting at the receiving end and reproduces the video data transmitted in response to the request, the second to fourth embodiments describe a receiving terminal which is connectable to the server via a network such as the Internet, while the fifth embodiment describes a receiving terminal which can change the decoding operation when an error occurs, according to the result of comparison between the I-frame interval of the received video data and a predetermined value set in the receiving terminal. As specific examples of the receiving terminals according to the second to fifth embodiments, there is a PC (Personal Computers) or a handy phone which is described as an example of the receiving terminal of the first embodiment.

Embodiment 6

Hereinafter, a handy phone, which requests the server to transmit video data having an anti-error intensity specified by user setting, will be described as a sixth embodiment of the present invention.

Figure 16:
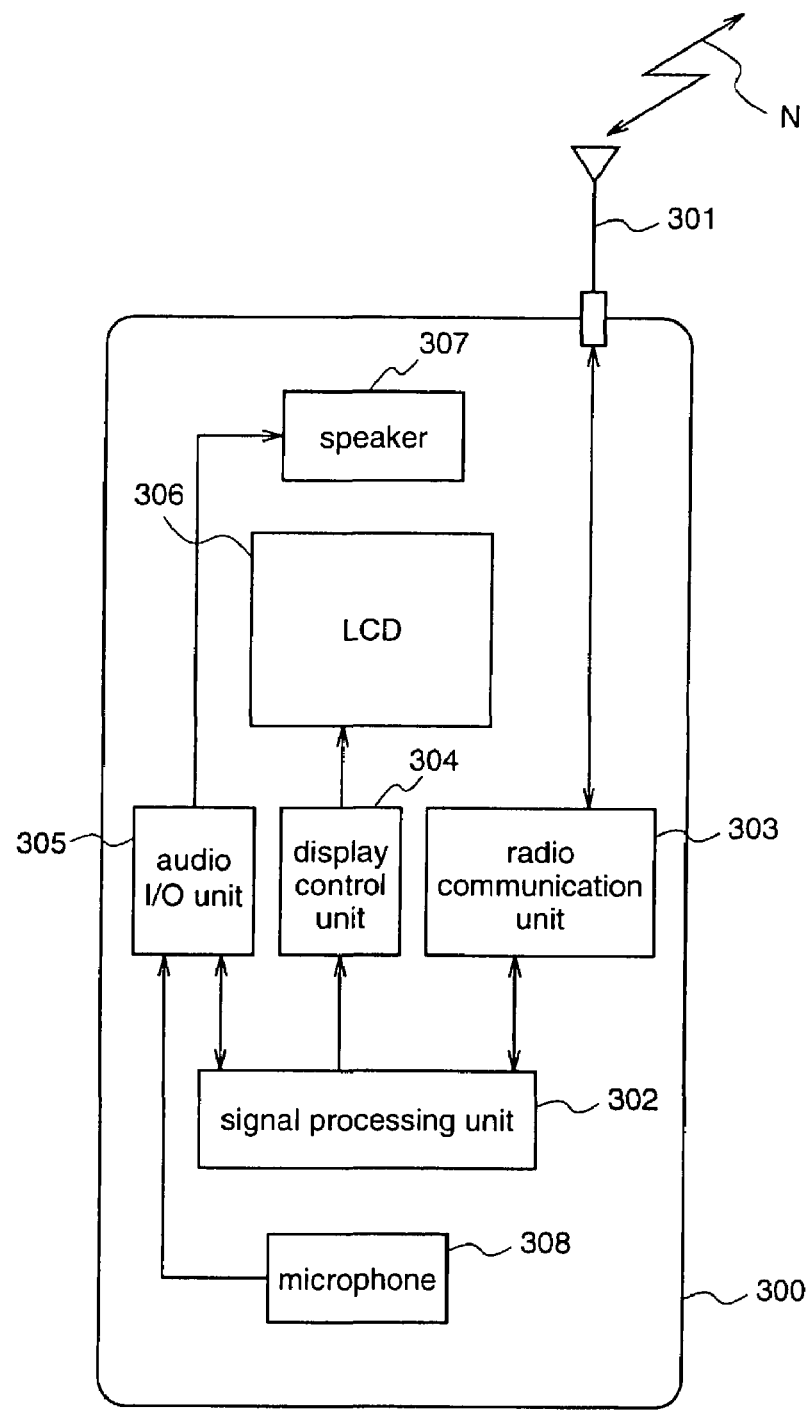
FIG. 16 is a diagram for explaining a handy phone as a data reproduction apparatus according to a fixth embodiment of the present invention.

FIG. 16 is a block diagram for explaining the handy phone according to the sixth embodiment.

A handy phone 300 includes a signal processing unit 302 for performing various kinds of signal processing; and a radio communication unit 303 for outputting a radio signal N received by an antenna 301 to the signal processing unit 302 as a reception signal, and transmitting a transmission signal generated by the signal processing unit 302 from the antenna 301 as a radio signal N.

The handy phone 300 further includes a liquid crystal display (LCD) 306 for performing video display; a microphone 308 for receiving an audio signal; a speaker 307 for reproducing the audio signal; a display control unit 304 for receiving the video signal processed by the signal processing unit 302, and controlling the LCD 306 so as to perform video display on the basis of the video signal; and an audio input/output unit 305 for outputting the input audio signal from the microphone 308 to the signal processing unit 302, and outputting the audio signal processed by the signal processing unit 302 to the speaker 307. For simplification, a button operation section of the handy phone is not shown in FIG. 16.

The signal processing unit 302 performs the same data reproduction process as the data reproduction apparatus 200b according to the second embodiment. That is, the signal processing unit 302 is provided with components corresponding to the HTTP transmission/reception unit 211, the RTSP message transmission/reception unit 214, the SMIL data analysis unit 212b, the RTP data reception unit 216b, the decoding unit 210, and the user operation unit 213, which are included in the reception terminal of the second embodiment. Further, the display control unit 304 and the LCD 306 of the handy phone 300 correspond to the display unit 218 of the second embodiment.

In the handy phone 300 constructed as described above, the user sets an anti-error intensity of video data to be received and performs operations for reproducing video data corresponding to specific contents. Then, RTP packets of a video stream suited to the user set value of the anti-error intensity are sequentially transmitted from the server to the handy phone 300. In the handy phone 300, the video stream from the server is reproduced, and switching of the video stream is carried out according to the incidence of transmission error in the video stream which is being received.

While in this sixth embodiment the handy phone 300 performs the same data reproduction process as the data reproduction apparatus of the second embodiment, the handy phone 300 may perform the same data reproduction process as any of the data reproduction apparatuses (receiving terminals) 200c, 200d, and 200e of the data transmission systems according to the third to fifth embodiments.

Furthermore, while in the first to sixth embodiments the data reproduction apparatus (receiving terminal) or the data transmission apparatus (server) are implemented by hardware, these apparatuses may be implemented by software. In this case, the data reproduction apparatus (receiving terminal) and the data transmission apparatus (server) can be constituted in an independent computer system by recording a program for performing the data reproduction process or the data transmission process described for any of the above embodiments, in a data storage medium such as a floppy disk.

Figure 17:
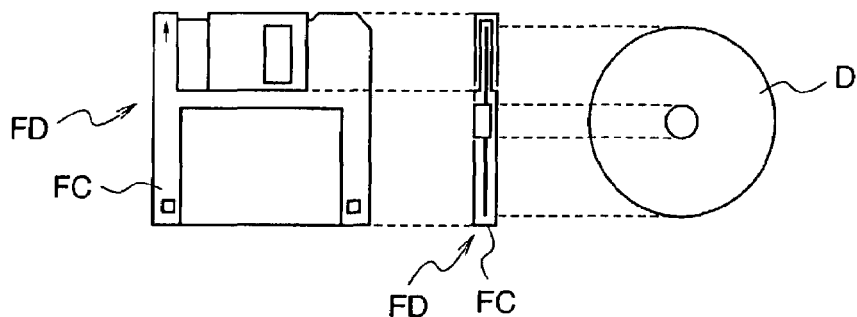
FIGS. 17(a) and 17(b) are diagrams for explaining a data storage medium which contains a program for making a computer system perform the data reproduction/transmission process according to any of the above-described embodiments.
FIG. 17(c) is a diagram for explaining the computer system.
Figure 17:
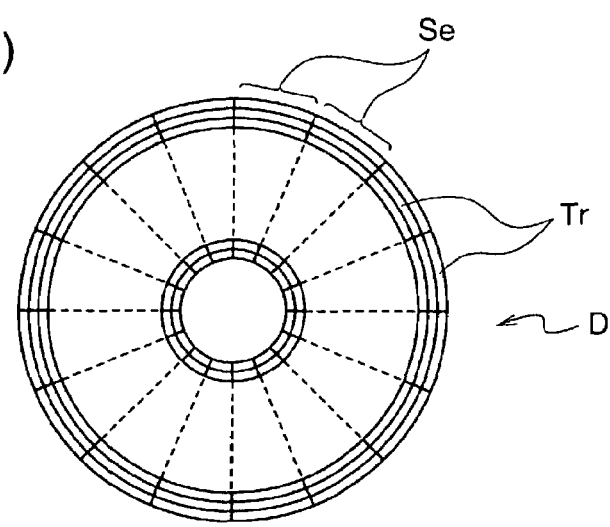
Figure 17:
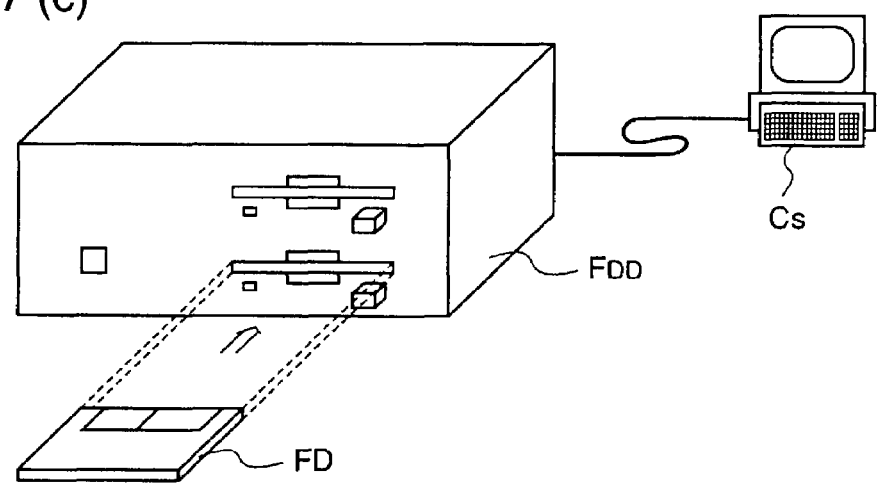
Figure 18:
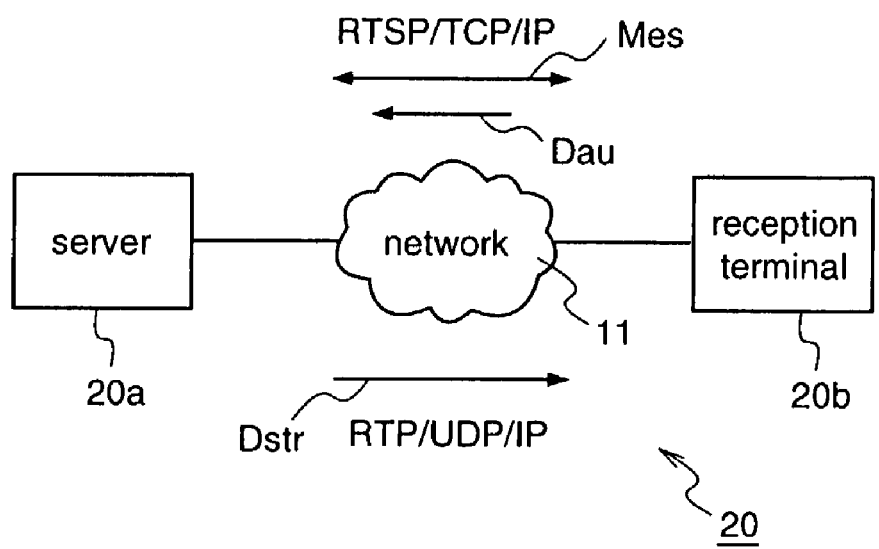
FIG. 18 is a diagram for explaining a communication system for distributing video data utilizing the Internet.
Figure 19:
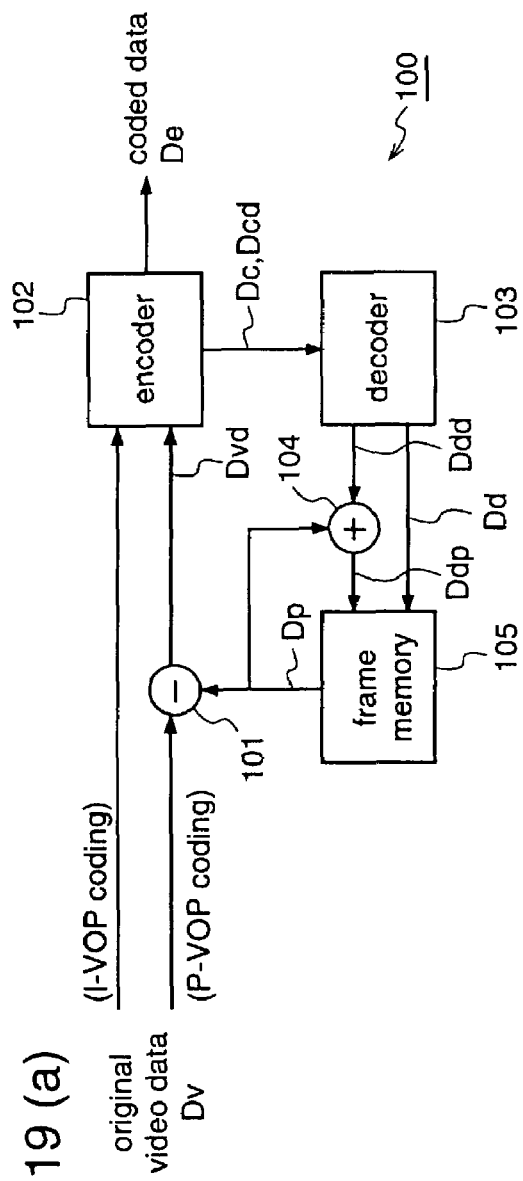
FIGS. 19(a) and 19(b) are diagrams for explaining a conventional video coding apparatus, illustrating the construction of the video coding apparatus (FIG. 19(a)), and a VOP-based coding process in the video coding apparatus.
Figure 19:
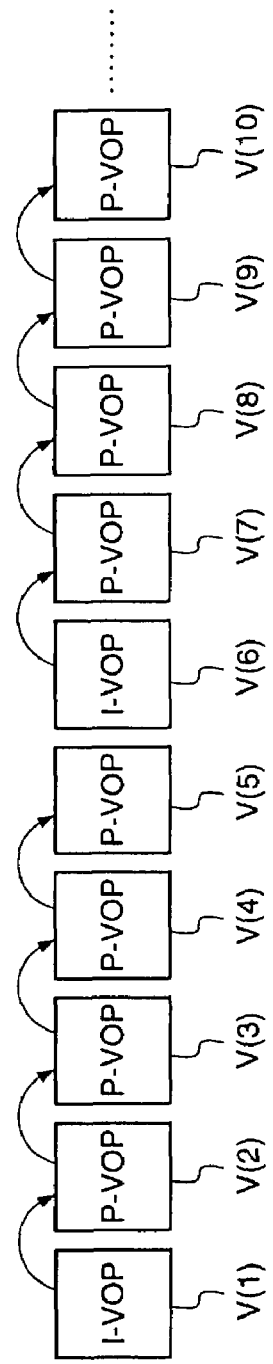
Figure 20:
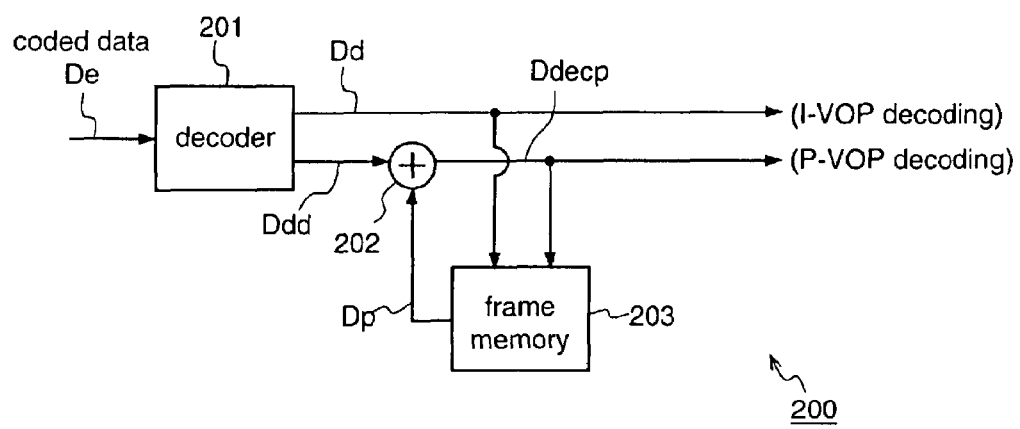
FIG. 20 is a block diagram for explaining a conventional video decoding apparatus.

FIGS. 17(a)-17(c) are diagrams for explaining a storage medium which contains a program for performing the data reproduction process or the data transmission process according to any of the above embodiments with software, and a computer system including the storage medium.

FIG. 17(a) shows the front view of a floppy disk FD, the cross-sectional view thereof, and a floppy disk body D, and FIG. 17(b) shows an example of a physical format of the floppy disk body D.

To be specific, the floppy disk FD is constituted by the floppy disk body D and the floppy disk case FC. On the surface of the floppy disk body D, plural tracks Tr are concentrically formed from the outer circumference toward the inner circumference. Each track Tr is divided into 16 sectors Se at equal angles along the circumference. Accordingly, in the floppy disk FD in which the above-described program is stored, data as the program are recorded in the sectors Se assigned onto the floppy disk body D.

Further, FIG. 17(c) shows a configuration for recording the program on the floppy disk FD, and a configuration for performing the data reproduction process or data transmission process by software using the program recorded on the floppy disk FD.

When recording the program on the floppy disk FD, data as the program supplied from a computer system Cs are written in the floppy disk FD via a floppy disk drive FDD. On the other hand, when constituting the data reproduction apparatus or the data transmission apparatus in the computer system Cs using the program recorded on the floppy disk FD, the program is read from the floppy disk FD by the floppy disk drive FDD, and loaded onto the computer system Cs.

While in the above description a floppy disk is employed as the data storage medium, an optical disc may be employed. Also in this case, the data reproduction process or the data transmission process by software can be carried out in the same manner as described with respect to the floppy disk. Furthermore, the data storage medium is not restricted to the floppy disk and the optical disc. Any medium, such as an IC card or a ROM cassette, may be employed so long as the program can be stored in the medium. Also in the case where these mediums are employed, the data reproduction process or the data transmission process by software can be carried out in the same manner as described for the floppy disk.

What is claimed is:

1. A data reproduction apparatus for receiving any of plural video data having different anti-error properties, and reproducing the received data, the data reproduction apparatus comprising:
    an auxiliary data reception unit for receiving auxiliary data indicating anti-error intensities of the respective video data;
    a data designation unit for generating a data designation signal which designates one of the plural video data, on the basis of a condition relating to video data to be received, and the anti-error intensities of the respective video data, which are indicated by the auxiliary data;
    a data transmission unit for transmitting the data designation signal; and
    a video data reception unit for receiving the video data which is selected from among the plural video data on the basis of the transmitted data designation signal, and then transmitted;
    wherein each of the plural video data having different anti-error properties includes intra-frame coded data which is obtained by coding a digital video signal employing intra-frame pixel value correlation, and inter-frame coded data which is obtained by coding the digital video signal using inter-frame pixel value correlation; and
    wherein appearance intervals of intra-frame coded data in the respective video data are different from each other.

2. The data reproduction apparatus of claim 1, wherein the plural video data having different anti-error properties correspond to the same video sequence, and frame rates of the respective video data are different from each other.

3. The data reproduction apparatus of claim 1, wherein the plural video data having different anti-error properties correspond to the same video sequence, and transmission protocols for the respective video data are different from each other.

4. The data reproduction apparatus of claim 1, further including:
    a decoding unit for decoding the video data received by the video data reception unit; and
    a control unit for changing an operation mode of the decoding unit, according to a preset operation condition.

5. The data reproduction apparatus of claim 4, wherein
    when the operation condition is to receive video data in which the appearance interval of intra-frame coded data is shorter than a predetermined value, the control unit sets the operation mode of the decoding unit to a first decoding mode in which, when a transmission error occurs, decoding is temporarily stopped until the intra-frame coded data is normally received; and when the operation condition is to receive video data in which the appearance interval of intra-coded data is equal to or longer than the predetermined value, the control unit sets the operation mode of the decoding unit to a second decoding mode in which, when a transmission error occurs, the inter-frame coded data is decoded excluding a portion which becomes undecodable due to the transmission error, until the intra-frame coded data is normally received.

6. The data reproduction apparatus of claim 5, wherein the second decoding mode is a mode of decoding video data of frames other than a frame whose data is lost due to the occurrence of the transmission error.

7. The data reproduction apparatus of claim 5, wherein
the video data are packetized in units of data that is smaller than a frame; and
the second decoding mode is a mode of decoding video data of packets other than a packet whose data is lost due to the occurrence of the transmission error.

8. A data reproduction apparatus for receiving any of plural video data having different anti-error properties, and reproducing the received data, the data reproduction apparatus comprising:
an auxiliary data reception unit for receiving auxiliary data indicating anti-error intensifies of the respective video data;
a data designation unit for generating a data designation signal which designates one of the plural video data, on the basis of a condition relating to video data to be received, and the anti-error intensities of the respective video data, which are indicated by the auxiliary data;
a data transmission unit for transmitting the data designation signal; and
a video data reception unit for receiving the video data which is selected from among the plural video data on the basis of the transmitted data designation signal, and then transmitted;
wherein the plural video data having different anti-error properties are first and second coded video data which are obtained by coding a digital video signal;
wherein the first coded video data is packetized such that the coded data corresponding to one frame is packetized in units of data that is smaller than the frame; and
wherein the second coded video data is packetized such that the coded data corresponding to one frame is packetized for each frame or in units of data that is larger than the frame.

9. The data reproduction apparatus of claim 8, wherein the plural video data having different anti-error properties correspond to the same video sequence, and frame rates of the respective video data are different from each other.

10. The data reproduction apparatus of claim 8, wherein the plural video data having different anti-error properties correspond to the same video sequence, and transmission protocols for the respective video data are different from each other.

11. A data reproduction apparatus for receiving any of plural video data having different anti-error properties, and reproducing the received data, the data reproduction apparatus comprising:
an auxiliary data reception unit for receiving auxiliary data indicating anti-error intensities of the plural video data;
an error detection unit for detecting a transmission error rate in the received video data;
a data designation unit for generating a data designation signal which designates one of the plural video data, on the basis of the detected transmission error rate in the received video data, and the anti-error intensities of the respective video data which are indicated by the auxiliary data;
a data transmission unit for transmitting the data designation signal; and
a video data reception unit for receiving video data which is selected from among the plural video data on the basis of the transmitted data designation signal, and then transmitted.

12. A data reproduction method for receiving any of plural video data having different anti-error properties, and reproducing the received data, the data reproduction method comprising:
an auxiliary data reception step of receiving auxiliary data indicating anti-error intensities of the plural video data;
a data designation step of generating a data designation signal which designates one of the plural video data, on the basis of a condition relating to video data to be received, and the anti-error intensities of the respective video data which are indicated by the auxiliary data;
a data transmission step of transmitting the data designation signal; and
a video data reception step of receiving video data which is selected from among the plural video data on the basis of the transmitted data designation signal, and transmitted;
wherein each of the plural video data having different anti-error properties includes intra-frame coded data which is obtained by coding a digital video signal employing intra-frame pixel value correlation, and inter-frame coded data which is obtained by coding the digital video signal using inter-frame pixel value correlation; and
wherein appearance intervals of intra-frame coded data in the respective video data are different from each other.

13. A data reproduction method for receiving any of plural video data having different anti-error properties, and reproducing the received data, the data reproduction method comprising:
an auxiliary data reception step of receiving auxiliary data indicating anti-error intensities of the plural video data;
an error detection step of detecting a transmission error rate in the received video data;
a data designation step of generating a data designation signal which designates one of the plural video data, on the basis of the detected transmission error rate in the received video data, and the anti-error intensities of the respective video data which are indicated by the auxiliary data;
a data transmission step of transmitting the data designation signal; and
a video data reception step of receiving video data which is selected from among the plural video data on the basis of the transmitted data designation signal, and transmitted.

14. A computer readable medium storing thereon a computer program for making a computer execute a data reproduction process of receiving any of plural video data having different anti-error properties, and reproducing the received data, wherein
the data reproduction process comprises:
an auxiliary data reception step of receiving auxiliary data indicating anti-error intensities of the plural video data;

a data designation step of generating a data designation signal which designates one of the plural video data, on the basis of a condition relating to video data to be received, and the anti-error intensities of the respective video data which are indicated by the auxiliary data;

a data transmission step of transmitting the data designation signal; and a video data reception step of receiving video data which is selected from among the plural video data on the basis of the transmitted data designation signal, and transmitted;

wherein each of the plural video data having different anti-error properties includes intra-frame coded data which is obtained by coding a digital video signal employing intra-frame pixel value correlation, and inter-frame coded data which is obtained by coding the digital video signal using inter-frame pixel value correlation; and wherein appearance intervals of intra-frame coded data in the respective video data are different from each other.

15. A computer readable medium storing thereon a computer program for making a computer execute a data reproduction process of receiving any of plural video data having different anti-error properties, and reproducing the received data, wherein the data reproduction process comprises:

an auxiliary data reception step of receiving auxiliary data indicating anti-error intensities of the plural video data;

an error detection step of detecting a transmission error rate in the received video data;

a data designation step of generating a data designation signal which designates one of the plural video data, on the basis of the detected transmission error rate in the received video data, and the anti-error intensities of the respective video data which are indicated by the auxiliary data;

a data transmission step of transmitting the data designation signal; and a video data reception step of receiving video data which is selected from among the plural video data on the basis of the transmitted data designation signal, and transmitted.

16. A data reproduction method for receiving any of plural video data having different anti-error properties, and reproducing the received data, the data reproduction method comprising:

an auxiliary data reception step of receiving auxiliary data indicating anti-error intensities of the plural video data;

a data designation step of generating a data designation signal which designates one of the plural video data, on the basis of a condition relating to video data to be received, and the anti-error intensifies of the respective video data which are indicated by the auxiliary data;

a data transmission step of transmitting the data designation signal; and a video data reception step of receiving video data which is selected from among the plural video data on the basis of the transmitted data designation signal, and transmitted;

wherein the plural video data having different anti-error properties are first and second coded video data which are obtained by coding a digital video signal;

wherein the first coded video data is packetized such that the coded data corresponding to one frame is packetized in units of data that is smaller than the frame; and wherein the second coded video data is packetized such that the coded data corresponding to one frame is packetized for each frame or in units of data that is larger than the frame.

17. A computer readable medium storing thereon a computer program for making a computer execute a data reproduction process of receiving any of plural video data having different anti-error properties, and reproducing the received data, wherein the data reproduction process comprises:

an auxiliary data reception step of receiving auxiliary data indicating anti-error intensities of the plural video data;

a data designation step of generating a data designation signal which designates one of the plural video data, on the basis of a condition relating to video data to be received, and the anti-error intensities of the respective video data which are indicated by the auxiliary data;

a data transmission step of transmitting the data designation signal; and a video data reception step of receiving video data which is selected from among the plural video data on the basis of the transmitted data designation signal, and transmitted;

wherein the plural video data having different anti-error properties are first and second coded video data which are obtained by coding a digital video signal;

wherein the first coded video data is packetized such that the coded data corresponding to one frame is packetized in units of data that is smaller than the frame; and wherein the second coded video data is packetized such that the coded data corresponding to one frame is packetized for each frame or in units of data that is larger than the frame.

* * * * *